United States Patent Office 3,407,387
Patented Oct. 22, 1968

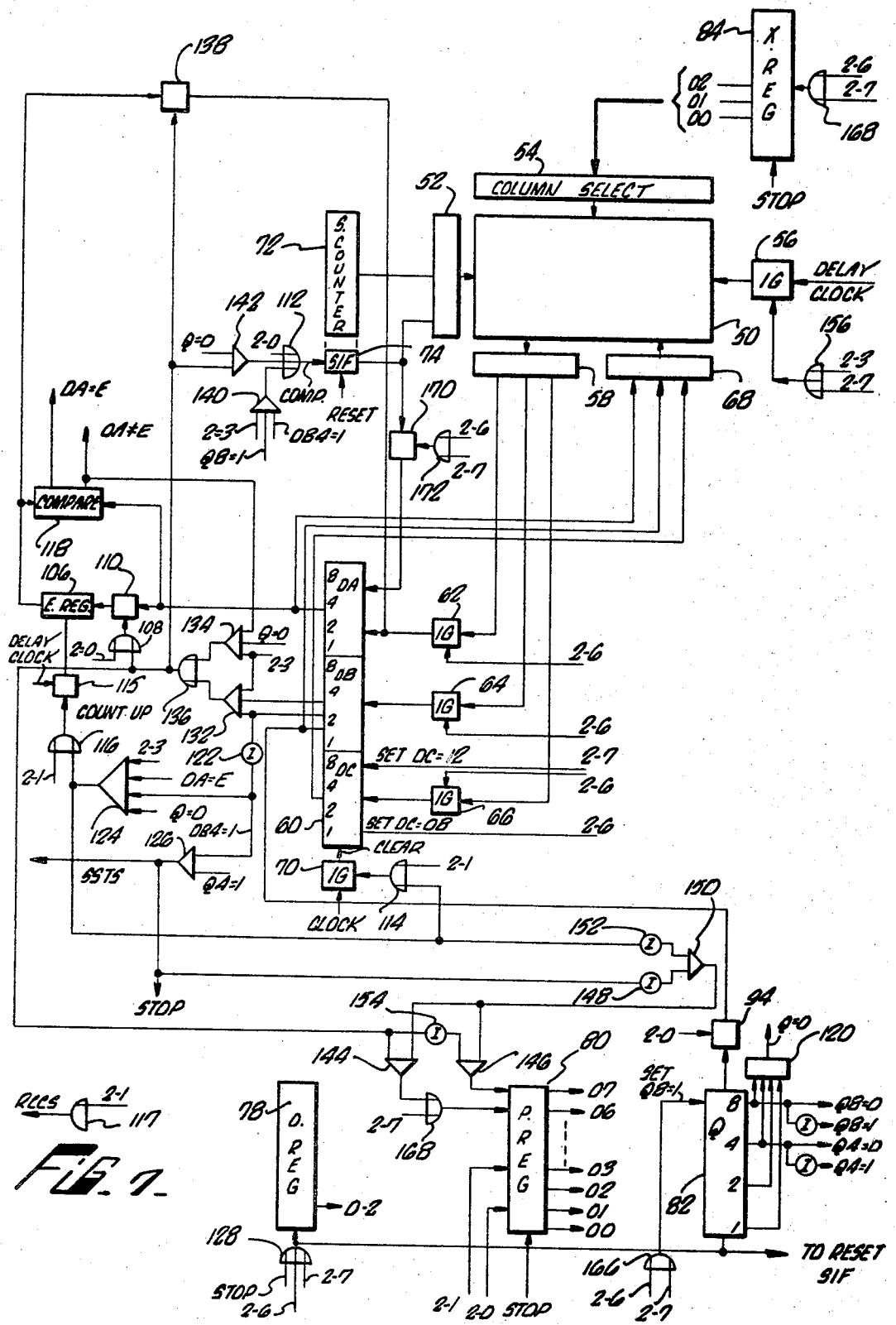

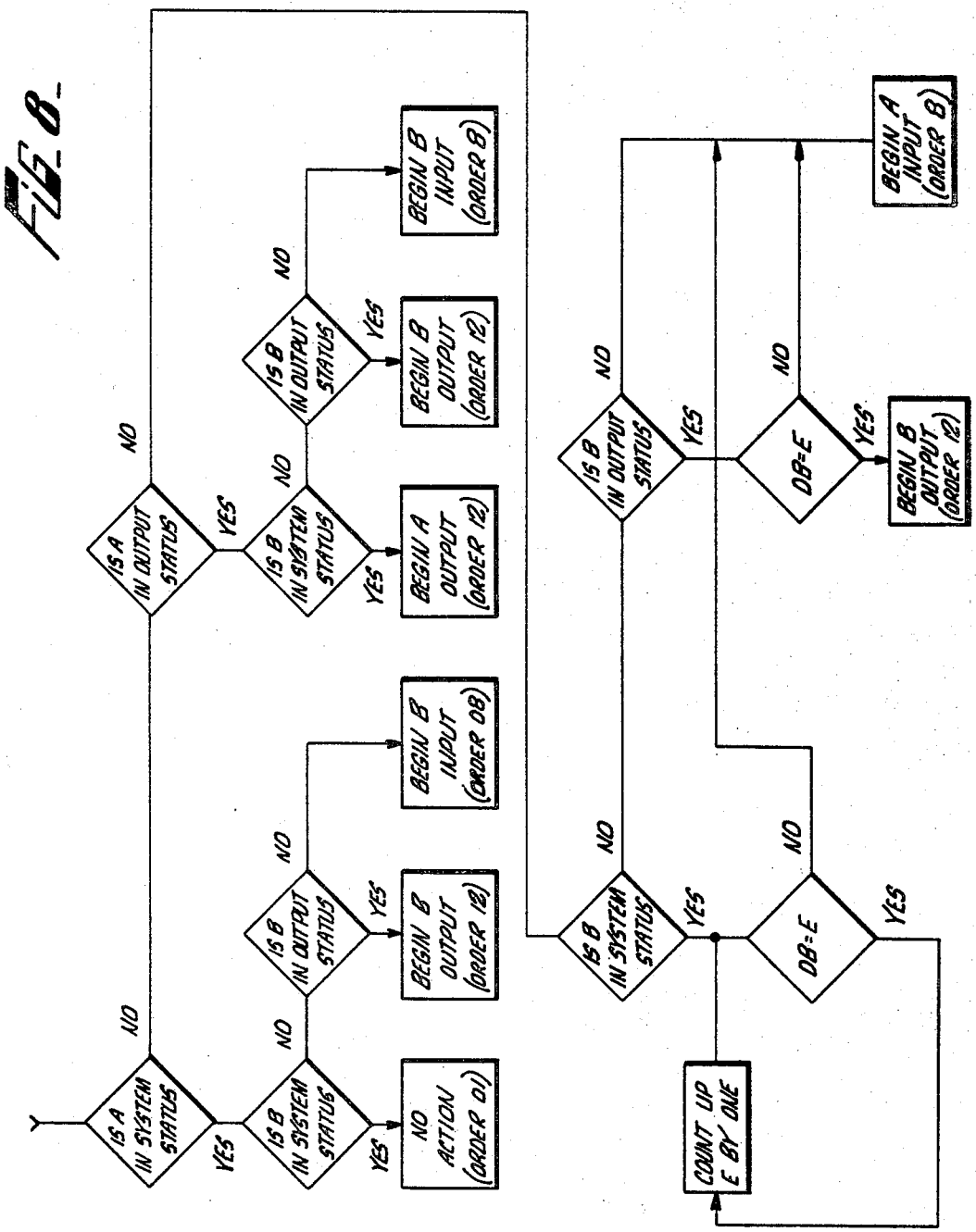

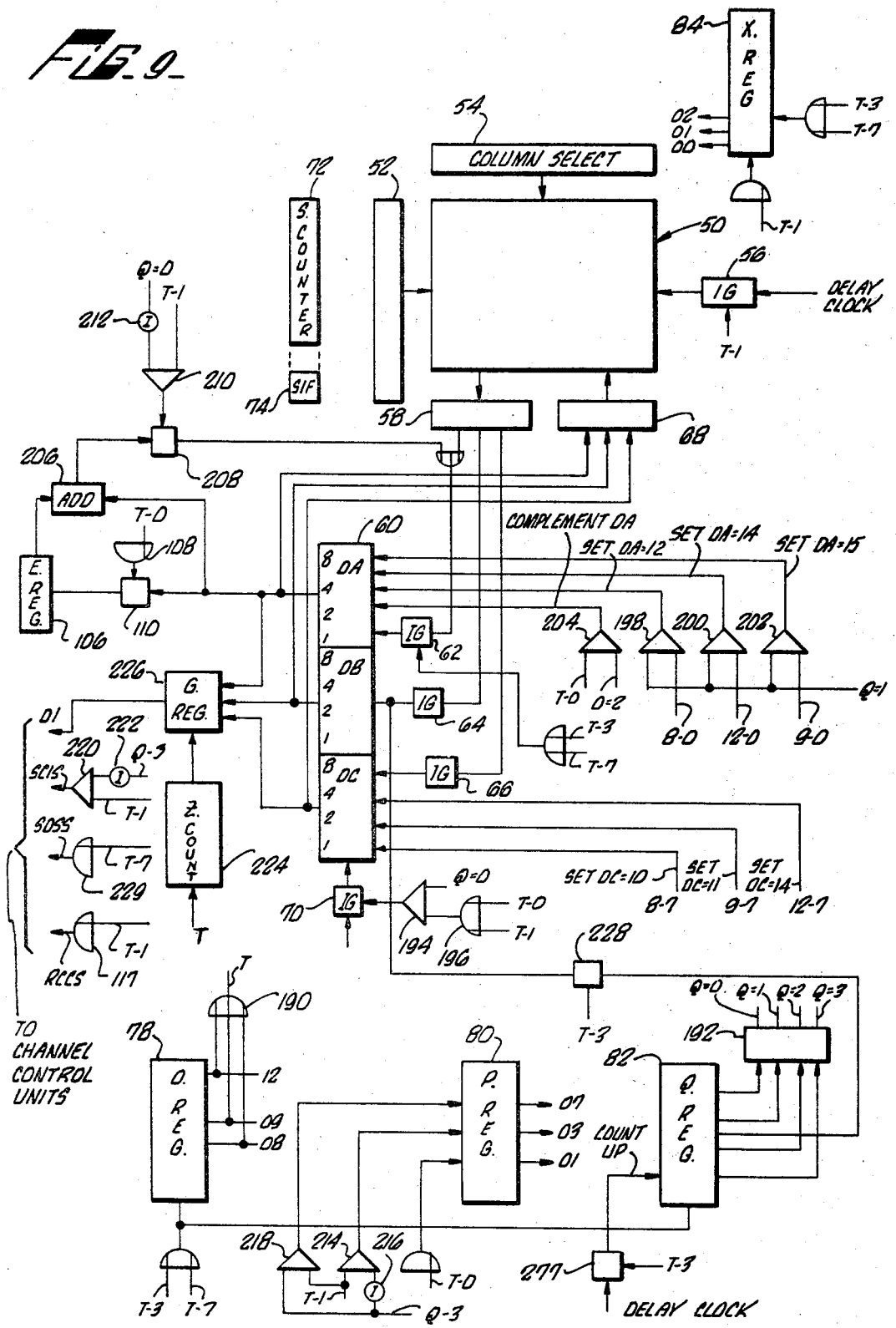

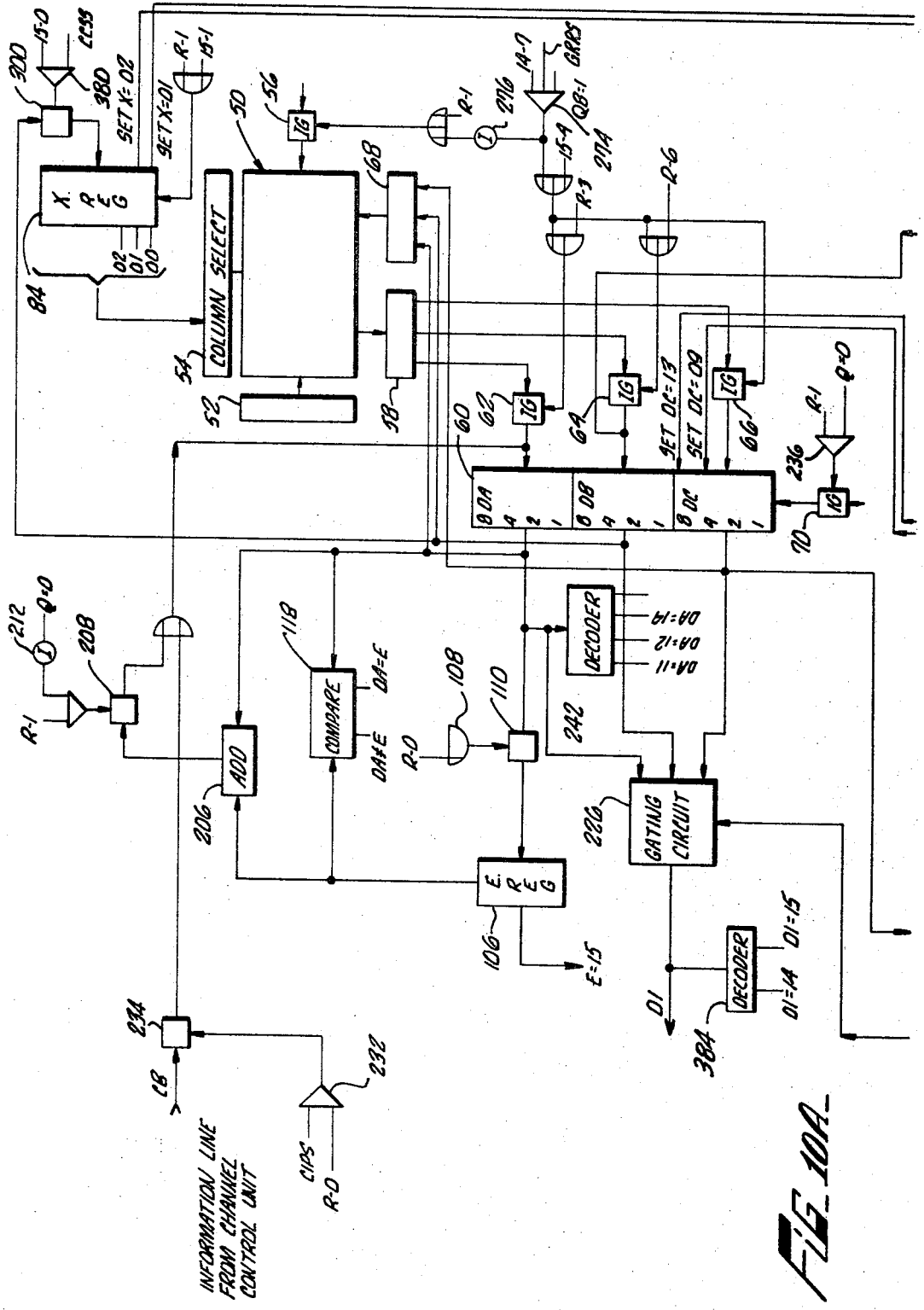

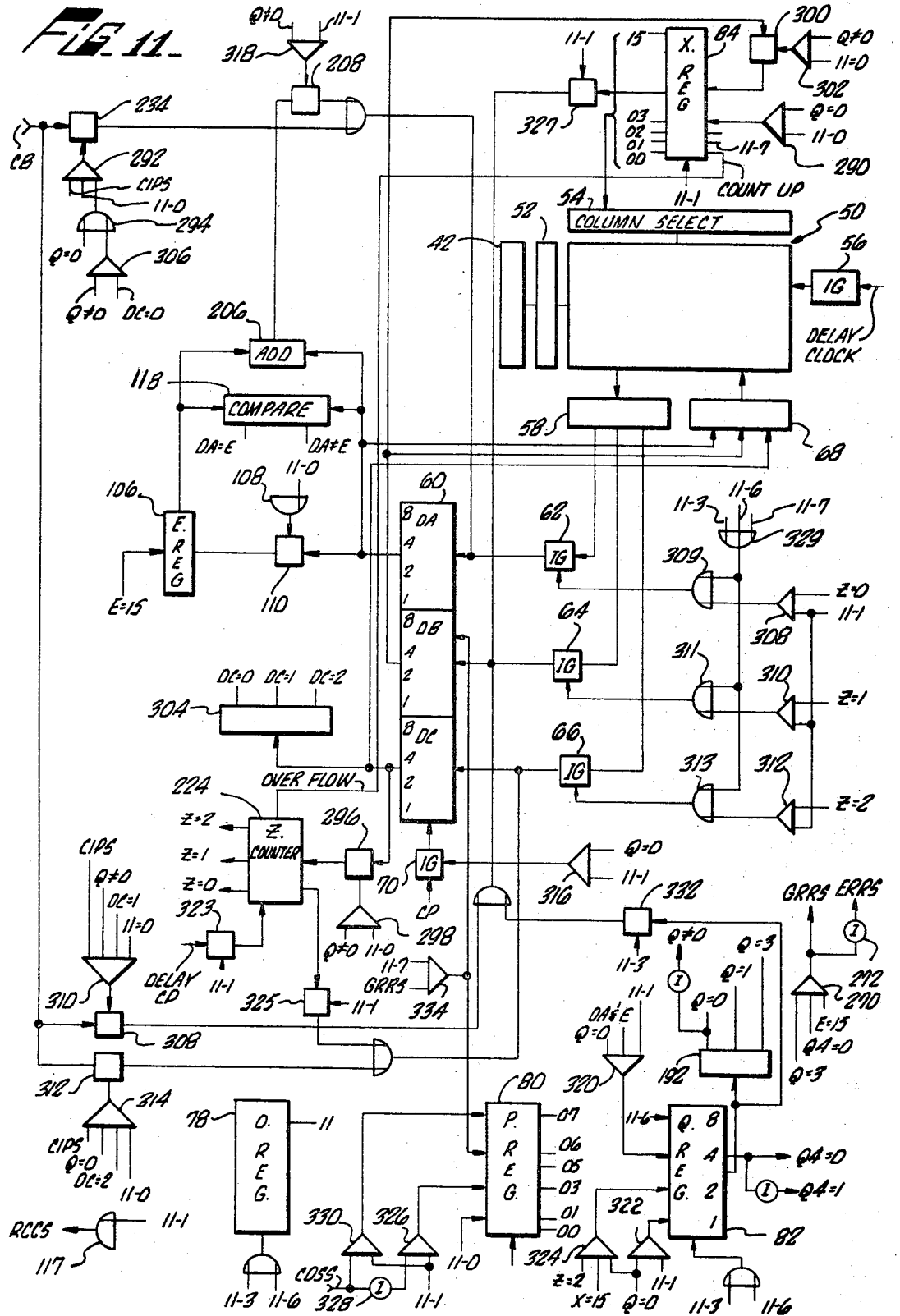

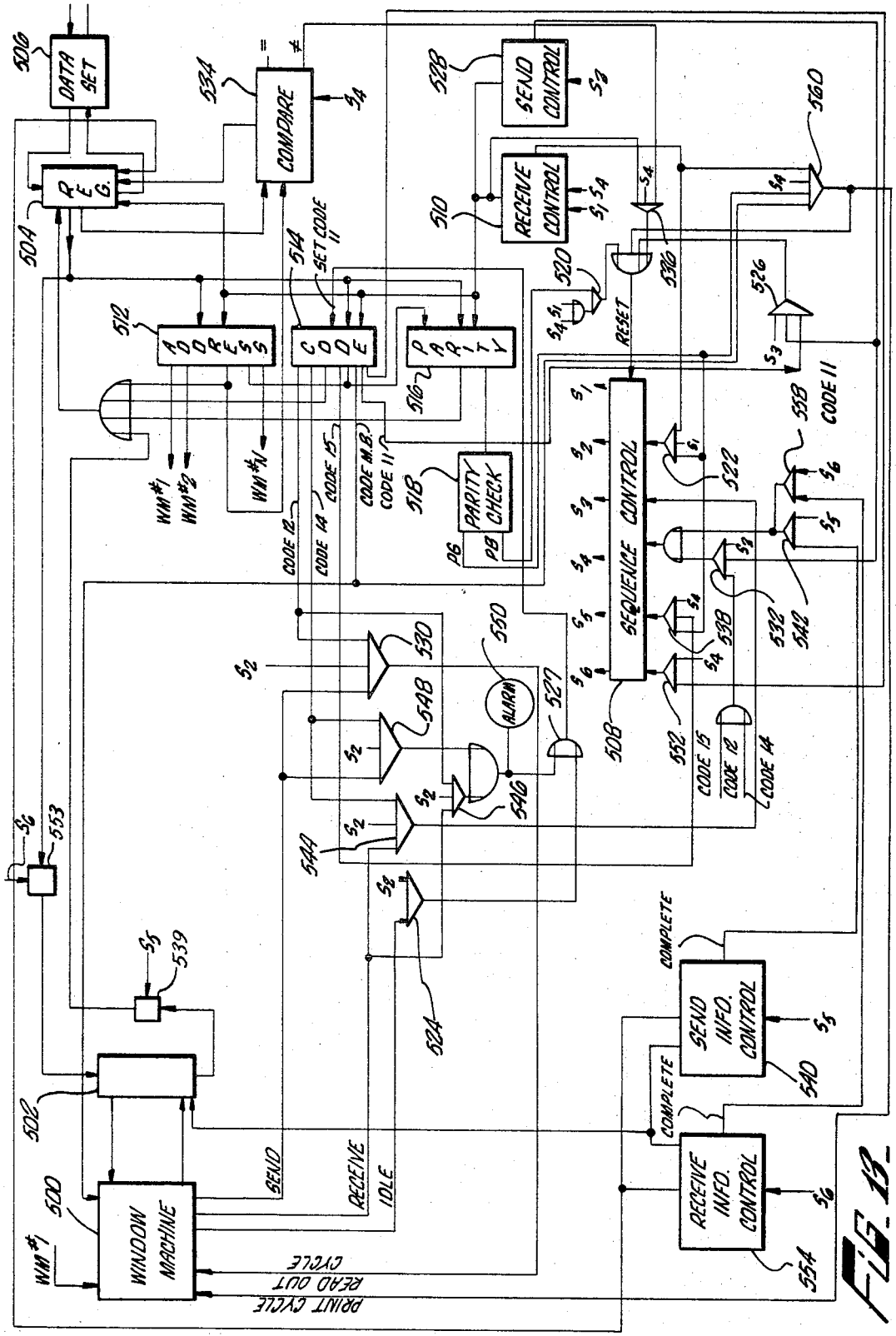

3,407,387
ON-LINE BANKING SYSTEM
Floyd W. Looschen and Iver C. Hansen, Arcadia, and Richard S. Sharp, Sierra Madre, Calif., assignors to Burroughs Corporation, Detroit, Mich., a corporation of Michigan
Filed Mar. 1, 1965, Ser. No. 435,954
12 Claims. (Cl. 340—152)

ABSTRACT OF THE DISCLOSURE

In an on-line banking system wherein a plurality of separate transmission channels provide communication between a plurality of teller windows and a central station having a data processing system. Each transmission channel connects a group of teller windows to a respective channel control unit. The control station having storage buffers for each channel control unit and means associated with each buffer for storing the address of a specific control unit and storing information designating whether the buffer is ready to send or receive data over the associated transmission channel or for communicating with the data processing system. Means for transmitting an address identification and coded information signal to each control unit and means at each unit when responsive for relaying the address designation back to the central station together with a coded signal.

---

This invention relates to an on-line banking system and, more particularly, a system in which a large number of accounts can be processed at a central station in response to communication with a plurality of teller windows located at a number of remote banking stations.

Heretofore, in large savings bank operations for example where a number of branch banks each have a number of teller windows at which deposits and withdrawals are made by a passbook each account had to be processed and updated by the teller and then the records collected at the end of the day for entering in the central bookkeeping operation. The present invention provides a system by which each of the teller windows at a number of banking locations is in communication with a central processor. Each teller is provided with a window machine in which he inserts the passbook and keys in the information as to the account number the previous balance and the amount to be deposited or withdrawn from the account. This information is transmitted to a central high speed data processor the balance is updated, interest payments are calculated and information is returned to the window machine to be printed into the passbook thus completing the transaction. Communication between the window machines of the tellers and the central processor is by digital transmission over telephone line equipment.

Several problems are encountered in such a system which are overcome by the present invention. All transactions must be handled with dispatch during peak operating conditions. Contention between a number of teller wnidow machines must be resolved efficiently. The high operating speed of the processor must be efficiently matched to the much slower speed of the window machine and the telephone transmission lines. Means must be provided to eliminate errors in communication.

In brief the present invention solves these and other problems by a unique system arrangement in which a group of window machines a teach remote banking station communicate over a common telephone link with a storage buffer unit at a central station. The buffer unit associated with the line from one remote banking station has two sections. A control circuit at the central station has complete control over all communications. The central station polls each of the window machines at the remote banking station by generating an address identifying a particular window machine and relaying the address as the first character of the message to a control circuit at the remote banking station. The polling message initiates a second character which is coded to ask for a particular response from the remote station such as a response that the addressed window machine is ready to send information, or that the addressed window machine is ready to receive information, or that the window machine has received a message correctly. The last character of a polling message is a parity check character. The central control unit must get back the proper response to the polling message before further action is taken with respect to the particular addressed window machine; otherwise a new address is generated and polling of the next window machine in sequence is initiated.

By the arrangement of two buffers per remote banking station, the relatively slow operating time of a window machine in reading out or printing information as well as the slow transmission time in communicating with a remote station relative to communication with the processor are more efficiently accommodated. Each buffer may be in three states, namely, input status for receiving information from the remote station, output status for sending information to the remote station, or system status for communicating with the high speed data processor. Only if both buffers are in system status is polling of the remote station interrupted. While one buffer is communicating information with a particular window machine, the other buffer is used to poll for input or output, depending on the status of the first buffer. Although only one transmission line is used, polling for input or output is done on a time sharing basis with the transmission of data, so that maximum efficiency is achieved.

For a more complete understanding of the invention, reference should be made to the accompanying drawings wherein:

FIGURE 7 is a block diagram of the central control unit logic for an order 2 operation;

FIGURE 8 is a flow diagram of the operation of order 2;

FIGURE 9 is a block diagram of the central control unit logic for an order 8, 9 or 12 operation;

Figure 10B:
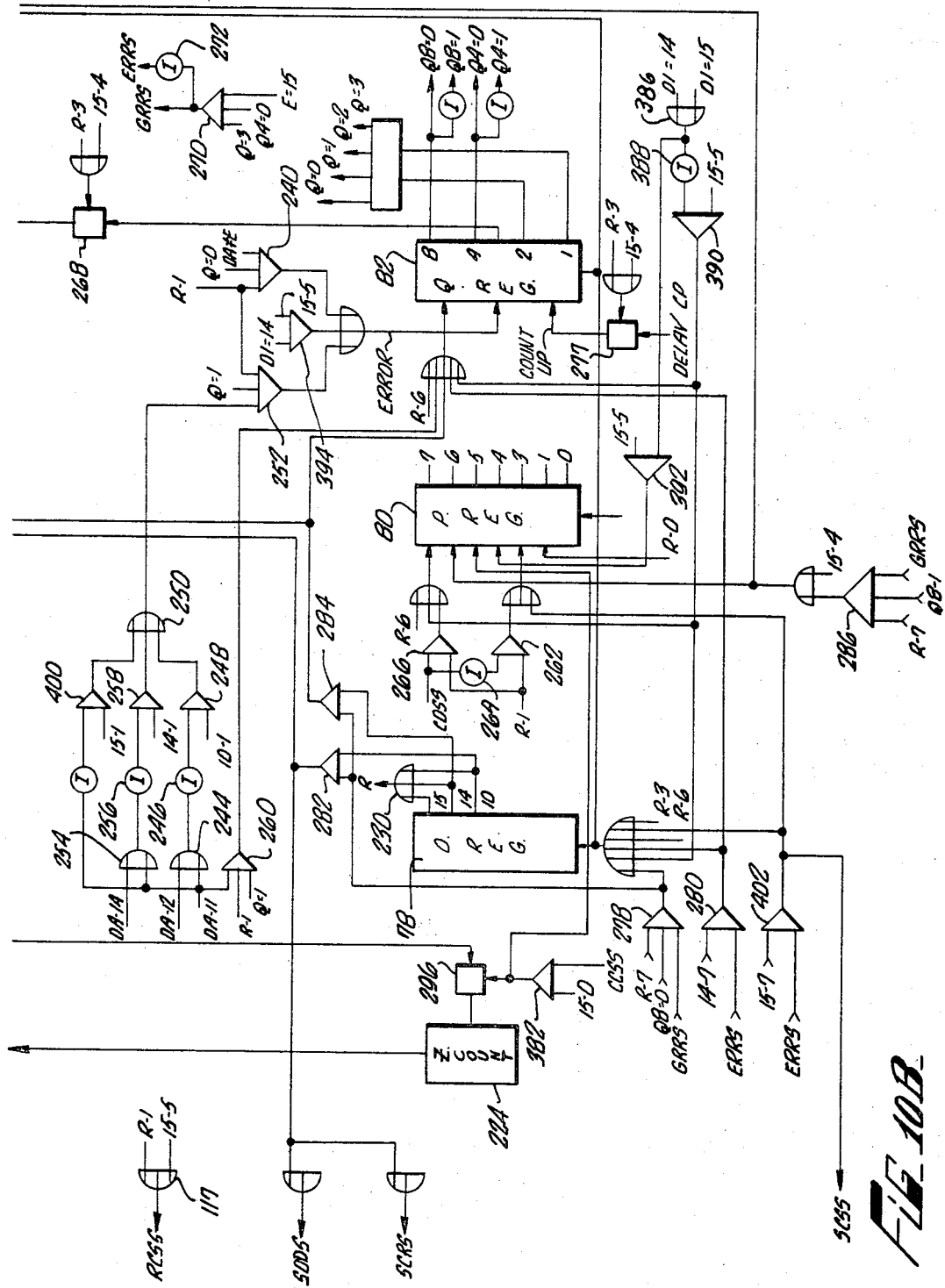
Figure 12:
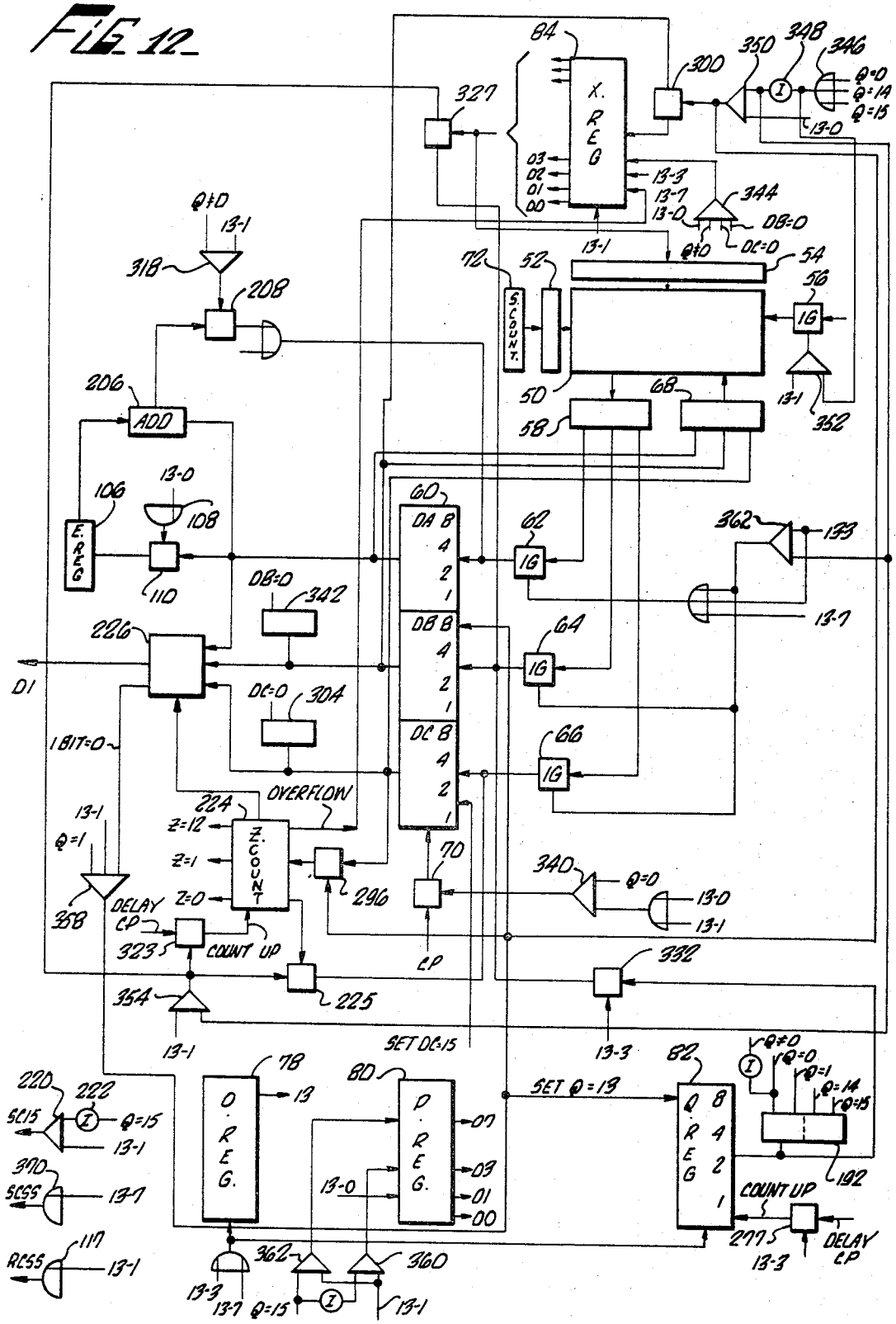

FIGURES 10a and 10b together a block diagram of the central control unit logic for an order 10, 14 or 15 operation;

FIGURE 11 is a block diagram of the central control unit logic for an order 11 operation;

FIGURE 12 is a block diagram of the central control unit logic for an order 13 operation; and FIGURE 13 is a block diagram of the remote terminal unit.

Figure 1:
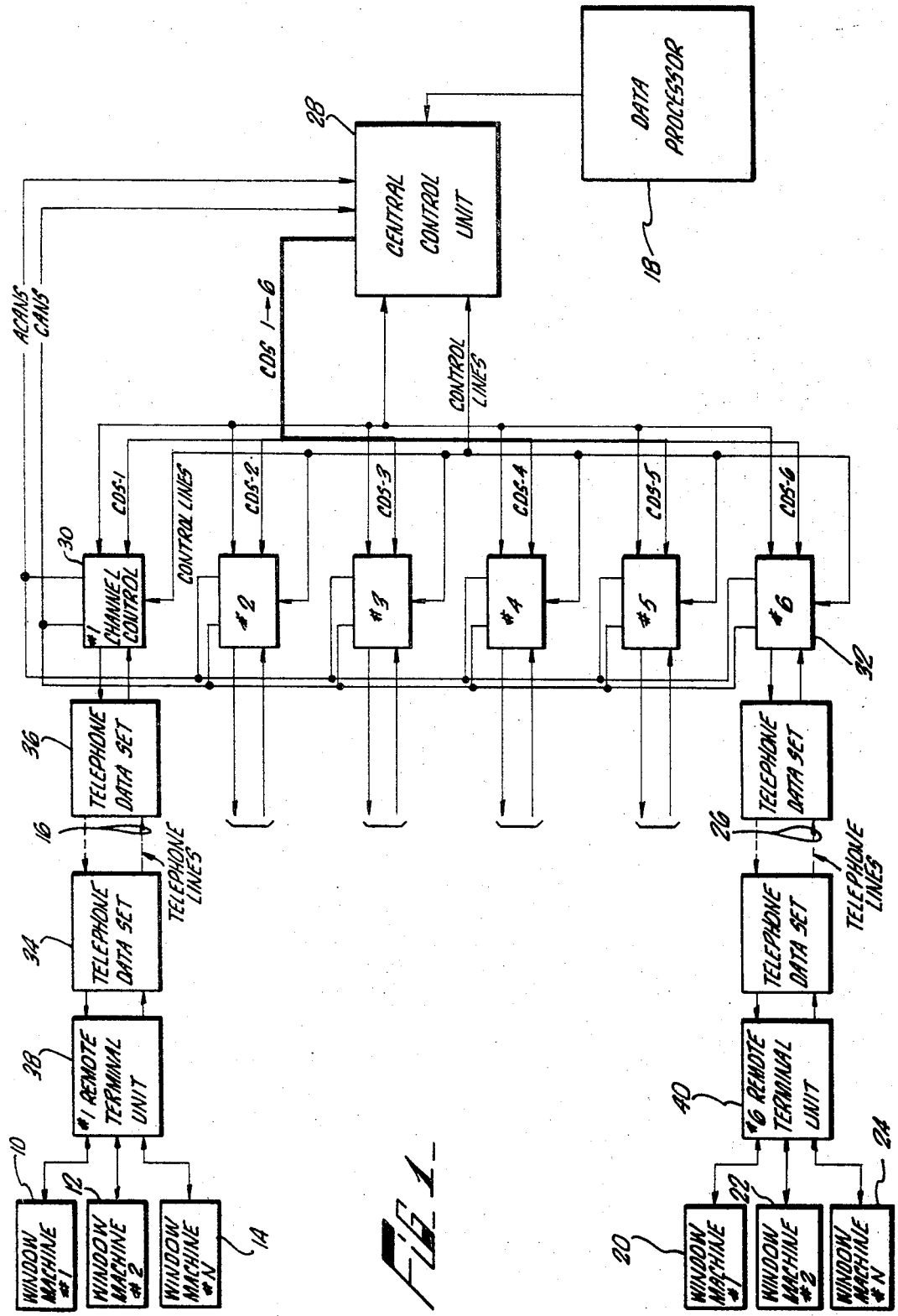
FIGURE 1 is a block diagram of the on-line banking system of the present invention.

Referring first to FIGURE 1, there is shown a block diagram of the overall on-line banking system. Each banking installation includes a plurality of window machines at the tellers' windows. A particular banking installation may include a plurality of such machines as indicated at 10, 12 and 14. Each window machine is a keyboard operated machine capable of receiving a passbook, such as the standard style F6214 Sensimatic machine sold by Burroughs Corporation. Information as to the account number, the previous balance and the amount being deposited or withdrawn are keyed into the window machine by the teller. During operation of the system, this information is relayed over a telephone line 16 to a data processor 18 at a central location where the information is stored, processed, and up-dated. The system accommodates similar window machines at other banking installations, a second group of window machines being indicated at 20, 22 and 24, which communicate over telephone lines 26. Each telephone line and its associated group of window machines is referred to as an input channel and the system, as shown in FIGURE 1, is designed to accommodate, by way of example only, six such channels.

Under the control of a central control unit 28, the input channels are scanned in sequence to poll in sequence the window machines at each of the remote banking stations to find a window machine that is ready to send information to or receive information from the processor. This operation, referred to as "polling for input" of "polling for output" depending on which way information is to be sent, is done under the full control of the central control unit 28. The central control unit 28 includes a pair of buffer storage elements for each channel which operate to temporarily store information received from or to be sent to the window machine units at the associated remote station.

In addition to the central control unit 28, each channel requires at the central station a channel control unit, such as indicated at 30 for channel #1 and indicated at 32 for channel #6. Telephone data sets, such as indicated at 34 and 36, are provided at each end of the telephone lines for translating digital information into serial modulated signals for transmission over the phone lines. The data sets 34 and 36 are standard telephone equipment and are furnished by the telephone companies who operate the telephone lines, as for example a Bell System 202D Data Set. The telephone data set 34 communicates with a remote terminal unit 38 located at a remote banking station, there being one remote terminal unit for each channel. The remote terminal unit for channel #6 is indicated at 40.

Before considering the details of the various units of the system as indicated by the blocks in FIGURE 1, it is desirable to have in mind a general understanding of the operation of the system. Considering first the "polling for input" operation in connection with the system of FIGURE 1, whenever a particular channel is not actually in the process of relaying information between the central unit and the remote unit, its associated channel control unit develops a signal indicating that it needs attention from the central control unit 28. These signals are combined in the central control unit to indicate when any channel needs attention. This signal is referred to hereinafter and is so indicated in the drawings as ACANS. On learning that some channel needs attention, a counter sends to each channel control unit in sequence a channel designate signal, indicated as CDS. These signals are numbered 1 through 6 to indicate the particular channel control unit which is designated. If the designated channel control unit is in the attention needed condition, it generates a "channel attention needed" signal, designated CANS which is relayed to the central control unit 28 indicating that the central control unit is designating a channel control unit that needs attention.

Once the central control unit designates a channel control unit that needs attention, it assigns a window machine address and determines the condition as to whether the associated buffer is ready to receive information from the window machine unit or is ready to relay information back to the window machine unit. Assuming that the associated buffer is ready to receive information from the window machine unit, the central control unit 28 generates a three character message which is relayed by the channel control unit to the remote terminal unit. This message includes the address of the particular window machine that was generated by the central control unit, followed by a code 12 character to indicate to the remote terminal unit that the central control unit is ready to receive information from the addressed window machine, and finally a parity character by which the remote terminal unit can check that the message received at the remote terminal was free from parity error.

At this point, the remote terminal unit checks the addressed window machine to see if an entry has been made by the teller. If so, the remote terminal unit generates a response message including the same window machine address, the same code 12 character and the same parity character and sends them back to the central control unit 28. On the other hand, if the particular window machine does not have any information entered into it at this time, the remote terminal unit will return a different message in which the address is the same but the code is changed to code 11, indicating that the remote terminal unit did not receive an accurate response or that the window machine is not ready to send any information into the central control unit.

The central control unit examines the code character of the response and if it indicates that the window machine is not ready to send information, the central control unit polls another window machine by assigning the next window machine address. On the other hand, if the code response indicates that the window machine is ready to transmit a message, the central control unit then sends a message back to the remote control unit, which message again includes the same window machine address and a code 15 character indicating that the remote terminal unit should now transmit the information to the buffer in the central control unit. This completes the polling for input operation. The window machine then transmits its information to the buffer in the central control unit where it is accessible to the data processor 18.

The central control unit on locating a channel control unit that needs attention may find that the associated buffer has been loaded by the data processor with information to be relayed back to the particular window machine. In this case it "polls for output." In polling for output, the central control unit sends a message to the remote terminal unit which includes the window machine address and a code 14 character, indicating information is ready to send, and parity. The remote terminal unit, in response to the code 14 character determines if the identified window machine is ready to receive print out information received from the data processor. If so, the remote terminal unit returns the window machine address together with the code 14 character indicating that it is ready for output. If the particular window machine is not ready to receive information it sends back a code 11 character which causes the central control unit to continue polling other window machines.

If the response from the remote terminal unit says that the window machine is ready to receive information, the central control unit proceeds to send a segment of the contents of the buffer to the remote terminal unit where it is printed out by the particular window machine. If the information segment is received successfully and printed out in the window machine, the remote terminal turns off the carrier on the telephone line, indicating to the central control unit that the information has been successfully relayed to the appropriate window machine.

Figure 2:
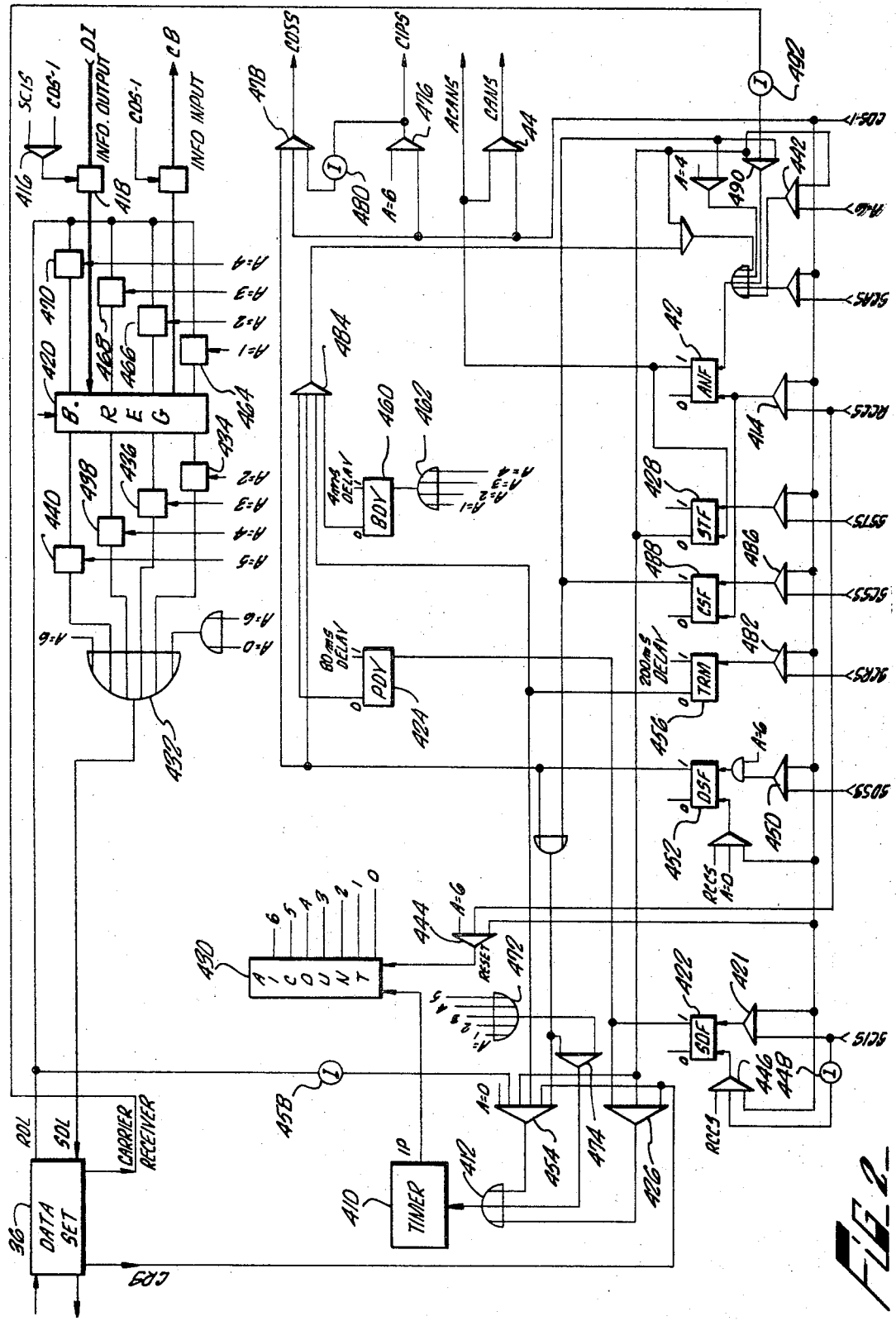
FIGURE 2 is a block diagram of a channel control unit.

Considering the operation of the central control unit in more detail, reference should first be made to FIGURE 2 which shows the channel control unit 30 in detail. The channel control unit receives a channel designate signal CDS–1 from the central control unit. Similar channel designate lines are directed to each of the other channel control units only one of these lines is true at a time. The channel control unit contains an attention needed flip-flop (ANF) 42 which is turned on whenever the channel control is not in the process of transmitting or receiving information. When the ANF flip-flop 42 is on in any of the channel control units, it provides a signal ACANS to the central control unit 28. If the ANF flip-flop 42 is on and the particular channel control unit in which the "channel designate signal" CDS is true, then a "channel attention needed signal" CANS from the particular channel control unit is true. The signal CANS, as shown in FIGURE 2, is produced by an AND circuit 44 to which is applied the "on" condition of the flip-flop 42 and the CDS–1 level.

Figure 5:
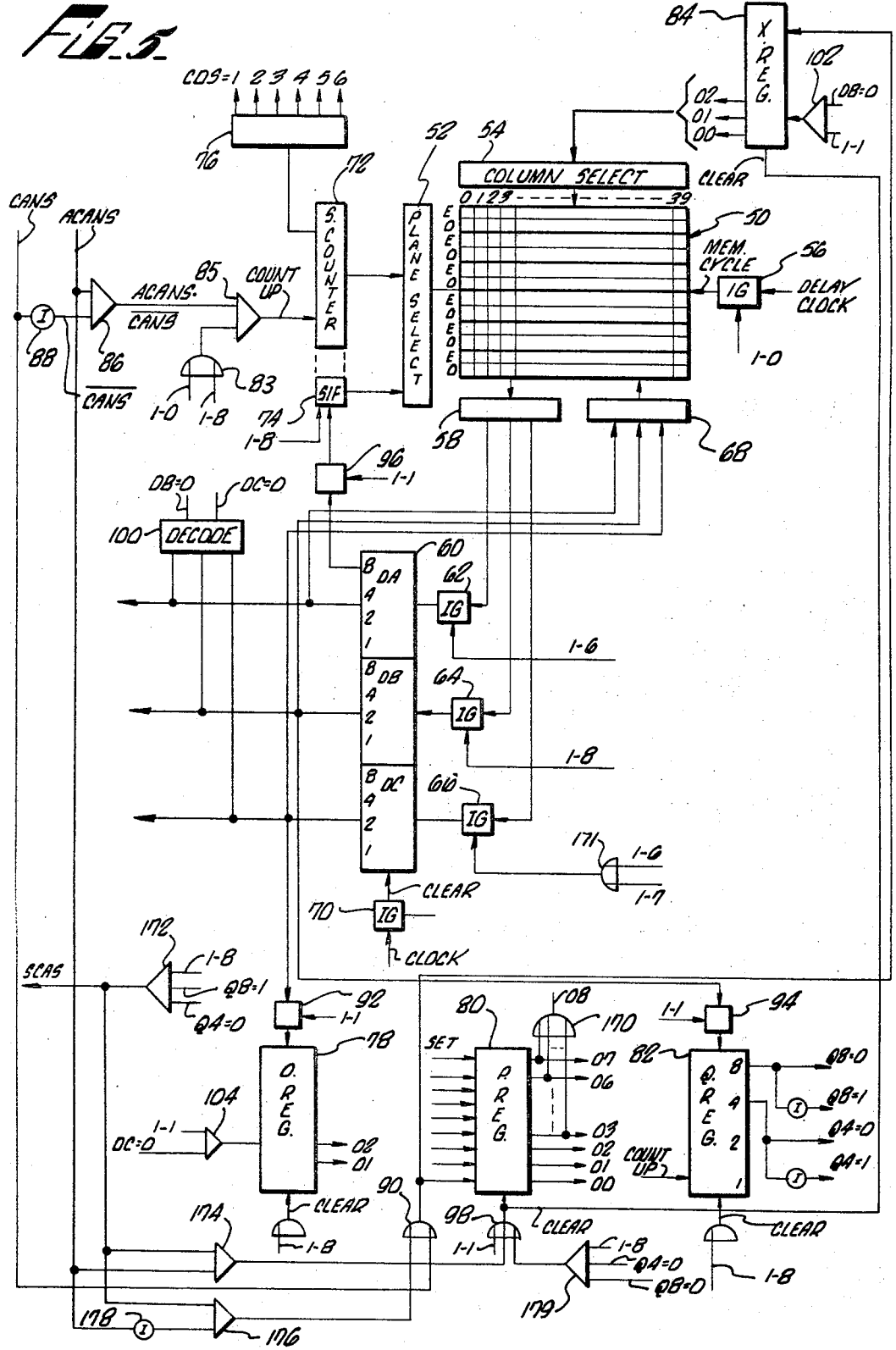
FIGURE 5 is a block diagram of the central control unit logic for an order 1 operation.

The operation of the central control unit will now be considered in detail by first making reference to FIGURE 5. Considering the operation of the central control unit, all logical operations are synchronized with a clock pulse source (not shown). Although not so shown in the block diagrams, it will be understood that all logical operations, unless otherwise described, occur in synchronism with successive clock pulses.

The central control unit 28 includes a storage facility 50 preferably in the form of a linear select core memory. The storage facility may be considered as made up of twelve separate memory planes any one of which can be selected by binary address information applied to a plane select circuit 52. Any one of forty columns, designated 0 through 39, in any one of the memory planes can be selected in response to binary coded information through a column select circuit 54. Once a selection has been made by the two selection circuits 52 and 54, one line of the memory, corresponding to one word of three characters, is read out during a memory cycle. A memory cycle is initiated by delayed clock pulses passed through an inhibit gate 56. The delay clock causes a memory cycle to take place between normal clock times. The word is read out by output drivers 58 and set into a D-register 60.

The D-register 60 is shown divided into three sections corresponding to the three characters of a word, the three sections being designated DA, DB, and DC. Each section stores four binary bits, designated 1, 2, 4, and 8. The three characters are applied to the D-register 60 by the drivers 58 through inhibit gates 62, 64, and 66, respectively. The output of the D-register 60 in turn is applied to a group of input drivers 68 which reset the contents of the D-register into the storage facility during the memory cycle. Normally the D-register is cleared by each clock pulse applied through an inhibit gate 70. Thus in operation it will be seen that a clock pulse normally clears the D-register and then, unless a signal is applied to the inhibit gate 56, the delayed clock initiates a memory cycle in which the selected word is read out to the D-register and read back from the D-register to the storage facility to provide a non-destructive read-out memory cycle. By applying a signal to any one of the inhibit gates 62, 64, and 66, and inhibiting the clearing pulse by applying a signal to the inhibit gate 70, a word or any selected character of a word in the D-register can be written into the storage facility to replace an existing word during a memory cycle operation.

The twelve memory planes provide in effect two memory planes for each transmission channel of the system. These are designated the "odd" and "even" buffers for each channel. Selection of a particular pair of memory planes is provided by a binary S-counter 72 which counts from one to six, thereby always designating one of the buffer pairs. An S1F flip-flop 74 is set to select the even or odd plane of the selected pair. In addition to being applied to the plane select circuit 52, the S-counter 72 is also applied to a decoder 76, the output of which provides a channel designate level on one of six output lines indicated at CDS–1 through CDS–6. The output lines of the decoder 76 are applied to the respective channel units to designate a particular one of the channel control units.

The sequence of operations of the central control unit is under the control of three registers, designated respectively the O-register 78, the P-register 80, and the Q-register 82. The O-register 78 contains a particular order which the central control unit is executing, the P-register counts the sequence of steps during the successive clock pulse periods that the central control unit goes through in executing the particular order once, while the Q-register 82 records the number of times the particular order has been executed.

Column selection in the storage facility 50 is controlled by an X-register 84 which addresses the column select circuit 54 to designate one of forty columns of words in each of the memory planes of the storage facility 50.

The initial order in any sequence of operations by the central control unit is order 01, and it is the execution of this order which is set forth in the logic circuitry of FIGURE 5. The O-register 78 is always returned to order 01 when it is not executing some other order, and this is the condition of the O-register when it is cleared at the start of operation of the system. Therefore, assuming that the O-register 78 is now in its 01 condition, designating an order 01 operation, the 01 output line is activated. The P-register 80, when it is initially cleared, is in the condition to energize the 00 output line. Throughout the following discussion, the operation which occurs at any clock pulse time is determined by the combined setting of the O-register 78 and the P-register 80. To simplify the drawing, the logical gating circuitry to combine these two outputs is not shown but the condition of the two registers is indicated on any control line by two numbers designating respectively the state of the O-register 78 and the P-register 80. Thus for example, a line designated 2–7 indicates a control line is true when the O-register 78 is in the 02 state and the P-register 80 is in the 07 state.

In the order 01 operation, the central control unit must first find a channel which needs attention. This is done by counting up the S-counter 72 during the 1–0 state of the O-register and the P-register. The 1–0 state is applied through an OR gate 83 to an AND gate 85 together with the output of an AND gate 86 to which is applied the ACANS level from the channel control units. The CANS level is also applied through an inverter or negating circuit 88 to the AND gate 86. By this logic, when any one of the channel control units needs attention, as indicated by the ACANS level, but a particular channel, needing attention is not designated by the S-counter 72 over the appropriate line CDS, the output of the AND circuits 86 and 85 are true.

In response to the output of the AND circuit 85, the S-counter 72 is counted up by successive clock pulses until a channel designate line from the output of the decoder 76 causes the channel attention needed signal CANS from the corresponding channel control unit to go true. The CANS signal is also applied through an OR circuit 90 to set the P-register 80 to the $P=01$ condition. The output of the OR circuit 90 is also applied to the X-register 84 to set it into the $X=02$ condition for selecting the third column in the storage facility 50.

With the O-register 78 in the 01 condition and the P-register 80 in the 01 condition, the 1–1 state exists during the next clock interval. It should be noted that during the 1–0 state described above, no memory cycle was initiated since the 1–0 level was applied to the inhibit gate 56 associated with the storage facility 50. However, during the 1–1 state, the memory cycle is not inhibited. With the X-register set at 02 and the S-counter 72 set to select one of the two buffers associated with the designated channel and the S1F flip-flop 74 initially designating the even one of the memory buffers, it will be seen that the memory cycle reads out the word from the third column of the even buffer of the designated channel during the 1–1 state.

Figure 6:
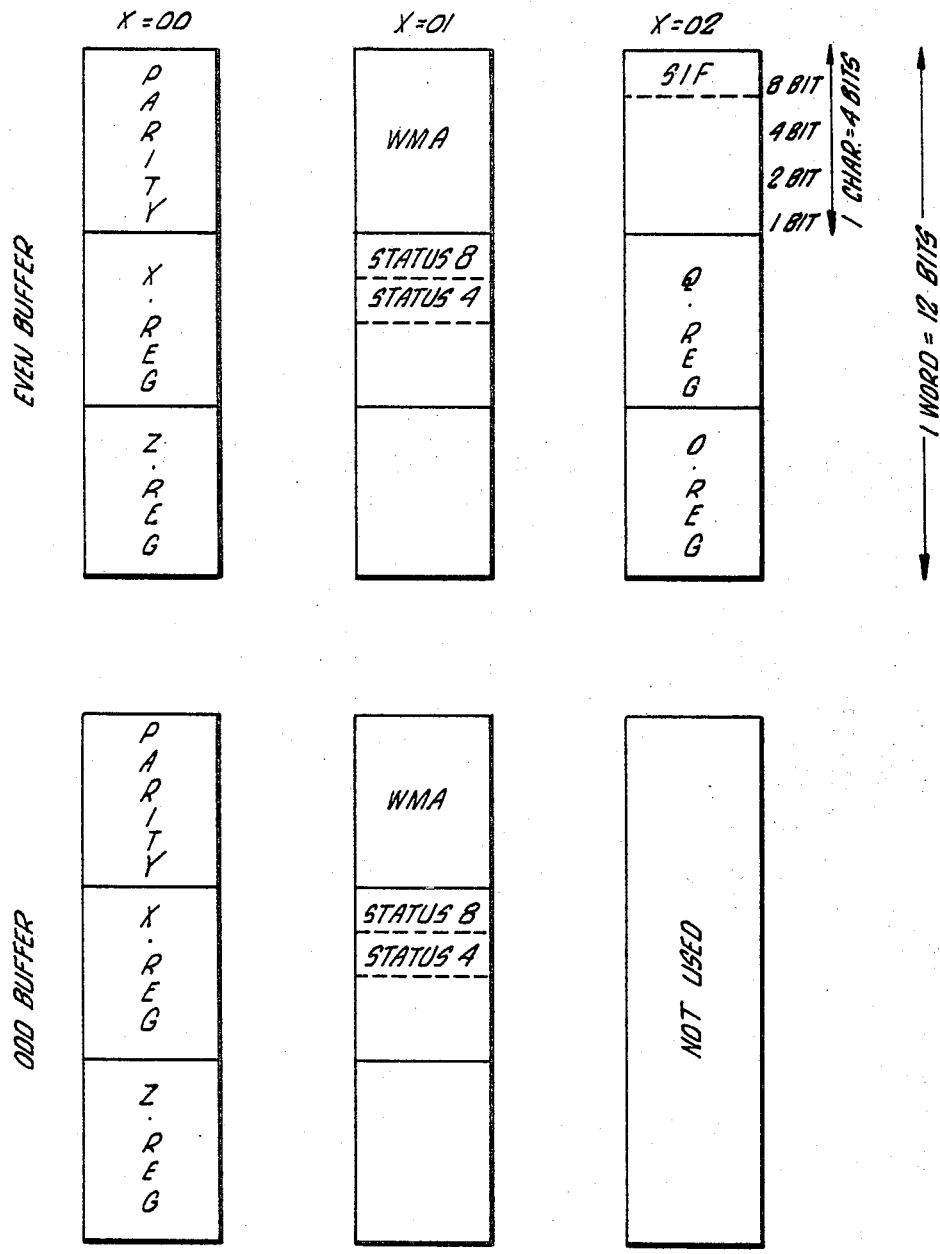
FIGURE 6 is a diagram showing the format of control words in the central control unit.

Referring to FIGURE 6, the format of the words stored in the first three columns of the even and odd buffers associated with a particular channel is shown. These words are only used for control purposes. It will be seen that each word is composed of twelve bits, each word in effect being made up of three characters of four bits each. The bits of each character are designated the 1-bit, the 2-bit, the 4-bit, and the 8-bit for purposes of identification. In the $X=02$ or third column of the even buffer, only the 8-bit of the first character is used. This bit designates which buffer is assigned to the channel and since this is determined by the S1F flip-flop 74, the 8-bit position in FIGURE 6 is shown as containing the S1F bit.

The second and third characters in the $X=02$ column of the even buffer store respectively the next count condition of the Q-register 82 and the next order for the O-register 78, referred to as the Q-count and order respectively. The Q-count indicates the number of times a particular order has been executed and the O-register count, of course, stores the order to be executed. Thus it will be seen that the memory cycle during the 1–1 state loads the D-register 60 so that the order is loaded in the DC section of the D-register, the Q-count is loaded in the DB section of the D-register 60, and the 8-bit position of the DA portion of the D-register 60 is loaded with the bit designating which buffer of the pair is assigned to the channel. Either the even or odd buffer of the two buffers assigned to the designated channel may be used depending upon previous conditions, but initially the bit in the DA–8 position of the D-register will be 0 and will point to the even buffer. Likewise, in the initial operation, the order in the DC portion of the D-register 60 will be 0 as will be the Q-count in the DB portion of the D-register 60.

The clock pulse at the end of the 1–1 state transfers the contents of the DC portion of the D-register 60 through a gate 92 into the O-register 78. Similarly, the contents of the DB portion of the D-register 60 are loaded into the Q-register through a gate 94 and the DA 8-bit of the D-register 60 is loaded in the S1F flip-flop 74 through a gate 96. The 1–1 state applied to an OR circuit 98 causes the next clock pulse to clear the P-register 80, resetting it to 0 and to clear the X-register 84, resetting it to 0. It will be noted that the D-register 60 is automatically cleared by each clock pulse unless an inhibit level is applied to the inhibit gate 70.

Also during the 1–1 state, the Q-count and the order in the DB and DC sections of the D-register 60 are applied to a decoding circuit 100 to sense whether or not the order and Q-count are equal to 0. The $DB=0$ line from the decoder 100 is applied together with the 1–1 state to an AND circuit 102 for setting the X-register 84 to the 01 condition. This takes precedence over the clearing of the X-register described above. The $DC=0$ line together with the 1–1 state is applied to an AND circuit 104 for setting the O-register 78 to the 02 condition, thereby establishing the next order to be executed as order 2. It will be appreciated that if the Q-count and the order stored in the storage facility 50 had not both been 0, the O-register would now contain some order other than order 2 and the X-register would be pointing to the $X=0$ column. Such conditions only occur after a window machine address has been assigned to the particular buffer. It is during the order 2 operation that the window machine address is assigned.

Referring to FIGURE 7, the operation of the central control unit in executing order 2 is shown. The principal registers described in conjunction with FIGURE 5 are again shown in FIGURE 7 along with the logic circuitry necessary to execute the order 2 operation. With the O-register 78 and P-register 80 in the 2–0 state, a memory cycle is initiated, transferring the control word in the $X=1$ column of the buffer designated by the S-counter 72 and S1F flip-flop 74 to the D-register 60. As shown in FIGURE 6 the word stored in the $X=1$ column of either the even or odd column buffer stores a window machine address in the first character position and stores a status bit in both the 4-bit and 8-bit position of the second character. These two bits are referred to as the status 4-bit and the status 8-bit respectively. The clock pulse at the end of the 2–0 state then gates the contents of the DA section of the D-register 60, which is the window machine address, to an E-register 106 by applying the 2–0 state through an OR circuit 108 to a gate 110. The status 4- and status 8-bits are transferred to the Q-register 82 through the gate 94 during the 2–0 state. At the end of the 2–0 state, the P-register 80 is set to the 01 condition and the S1F flip-flop 74 is complemented by the output of an OR circuit 112 to which the 2–0 state is applied. The D-register 60 is automatically cleared by the clock pulse at the end of the 2–0 state. During the 2–1 state of order 2, a memory cycle is again initiated. Since the S1F flip-flop 74 has been complemented, the word in the $X=1$ column of the other buffer of the pair of buffers associated with the designated channel is read out into the D-register 60. The 2–1 state is applied through an OR circuit 114 to the inhibit gate 70 so that the word is retained in the D-register 60 rather than being cleared by the clock pulse.

During the 2–1 state, a delayed clock counts up the E-register 106 through a gate 115. The window machine address stored in the E-register 106 is thereby increased by one. The 2–1 state is also applied to the P-register 80 so that the P-register is advanced to the 03 condition at the end of the 2–1 state. An OR circuit 117 in response to the 2–1 state provides a reset signal, designated RCCS, that goes to the channel control unit to turn off the ANF flip-flop 42.

At this point in the operation of the central control unit in executing order 2, the window machine address and status bits for both the even and the odd buffers have been read out of the storage facility 50. The window machine address from one buffer has been stored in the E-register 106 and counted up one while the window machine address of the other buffer is stored in the DA section of the D-register 60. The status bids read out of the first buffer have been stored in the Q-register 82 while the status bits for the second buffer are stored in the DB portion of the D-register 60. Initially, of course, all status bits are 0 as are the window machine addresses.

At this point in the operation, it is necessary to look at the status of the two buffers associated with the designated channel to determine what further action is to be taken. As pointed out above, a buffer may be in three conditions designated by the status bits. If both the status-4 and the status 8-bits are 0, the associated buffer is ready to receive input information from a window machine. This is referred to as the input status of the buffer. If the status 4-bit has been set to 1, this indicates that the associated buffer is ready to communicate with the processor. This condition is referred to as the system status of the buffer. If the status 8-bit is 1, this indicates that the associated buffer is loaded with information to transmit to the window machine and is referred to as the output status of the buffer. The flow diagram of FIGURE 8 shows the various status conditions which can exist in the two buffers and the resulting action which is initiated depending upon the status of the two buffers. In the flow diagram, the first buffer to be read out by the memory cycle during the 2–0 state of order 2 has been designated A, whereas the second buffer read out during the 2–1 state is referred to as the B. It should be noted that the first buffer read out may be either the even or odd buffer depending upon the condition of the S1F flip-flop 74 at the start of execution of order 2.

Considering FIGURE 8 in detail, if the A buffer is in system status, the status of the B buffer is considered. If the B buffer is also in system status, no further action is taken and the operation is returned immediately to order 1. If the B buffer is in output status condition, the central control unit is set up to begin an output operation from the B buffer to the previously designated window machine. On the other hand, if the B buffer is not in output status but in input status, the central control unit is set up to begin an input operation from the next window machine unit in sequence.

If the A buffer is not in system status but in output status and the B buffer is in system status, the central control unit begins an output operation from the A buffer to the previously designated window machine. If, on the other hand, the B buffer is in output status when the A buffer is in output status, the central control unit begins an output operation from the B buffer to the previously designated window machine. If the B buffer is not in output status but in input status, then the central control unit initiates operation in which information is transferred from the next window machine in sequence to the B buffer.

As further shown in FIGURE 8, if the A buffer is neither in system status nor in output status but in input status and the B buffer is in system status, a comparison is made between the window machine address in the DB section of the D-register 60 and the contents of the E-register 106. If equal, the E-register is again counted up one. The purpose of this is to avoid assigning the same window machine address to both the A and B buffers. Once the window machine addresses are made unequal, an input operation begins for transferring information from the addressed window machine to the A buffer.

If the B buffer is in output status when the A buffer is in input status, again a comparison is made between the two window machine addresses and if they are equal, an output operation is commenced from the B buffer to the previously designated window machine. If the window machine addresses, on the other hand, are not equal, an input operation from the newly designated window machine to the A buffer is commenced. If both the A buffer and the B buffer are ready for input, that is, are neither in the system status nor the output status, as would be the case when operation is first commenced, for example, the A buffer is used to begin an input operation with the newly designated window machine address.

Referring again in detail to FIGURE 7, the logic for carrying out the priority sequence shown by the flow diagram of FIGURE 8 may be seen. With the O-register 78 and the P-register 80 now in the 2–3 state, a comparison between the new window machine address in the E-register 106 and the window machine address stored in the DA portion of the D-register 60 is made by a comparison circuit 118. A decoder 120 determines if the Q-register 82 is 0, indicating that the first or A buffer is in input status. The output from the 4-bit position of the Q-register 82 sets a true level on one of two output lines designated $Q4=0$ and $Q4=1$ respectively. Likewise, the 8-bit position of the Q-register 82 sets a true level on one of two lines designated $Q8=0$ and $Q8=1$ respectively. Thus if the A buffer is in the input status condition, the $Q4=0$ line is true, if the A buffer is in system status, the $Q4=1$ line is true, and if the first or A buffer is in output status, the $Q8=1$ line is true.

Similarly, the status bits of the second or B buffer as stored in the DB section of the D-register 60 are used to establish a true level on the $DB4=0$ line and the $DB8=0$ line if the B buffer is in input status. On the other hand, if the B buffer is in system status condition, a true level is derived through an inverter 122 to provide a true level on the $DB4=1$ line.

An AND circuit 124 has its output coupled through the OR circuit 116 to count up the E-register 106 during the 2–3 state if the contents of the E-register 106 and the DA section of the D-register 60 are equal. To this end, the 2–3 state is applied to the AND circuit 124 together with the $DA=E$ output of the compare circuit 118 and the $DB4=1$ level derived from the 4-bit position through the inverter 122. Also the $Q=0$ level from the decoder 120 is applied to the AND circuit 124.

If both buffers are in system status condition, further operation of the channel control unit is stopped. This is sensed by applying the $Q4=1$ level from the Q-register 82 and the $DB4=1$ level from the output of the inverter 122 to an AND circuit 126. The output of the AND circuit 126 provides a signal, designated SSTS, to the channel control for stopping operation of the channel. The Stop signal from the output of the AND circuit 126 is also applied to an OR circuit 128 to clear the O-register 78 back to the 01 condition, clear the Q-register 82, and S1F flip-flop 74. Also the Stop signal clears the P-register 80 and the X-register 84. Since no memory cycle takes place during the 2–3 state, the 2–3 state being applied to the inhibit gate through an OR circuit 156, the original contents of the buffers remain the same as they were at the time the order 2 was commenced.

If either buffer is in input status condition, the P-register 80 is advanced to the 06 condition. To this end, an AND circuit 132 has applied thereto the $DB4=0$ and $DB8=0$ lines from the D-register 60 together with the 2–3 state. Thus the output of the AND circuit 132 indicates that the B buffer is in input status condition. An AND circuit 134 has applied thereto the $Q=0$ level from the decoder 120 and also the $DA \neq E$ level from the compare circuit 118 together with the 2–3 state. Thus the output of the AND circuit 134 indicates that the A buffer is in input status condition and that the window machine address in the E-register 106 is not the same as the window machine address in the D-register 60. The output of the AND circuits 132 and 134 are combined by an OR circuit 136, the output of which is applied to a gate 138 which gates the contents of the E-register 106 back into the DA portion of the D-register 60, thereby placing the new window machine address in the D-register for use in polling the next window machine for input.

Since the S1F flip-flop 74 is now pointing to the last buffer addressed, namely, the B buffer, if the A buffer is to be used, it is necessary to complement the S1F flip-flop 74. As pointed out in connection with FIGURE 8, the A buffer is to be used if it is in output status and the B buffer is in system status. Therefore the $Q8=1$ and the $DB4=1$ levels are applied to an AND circuit 140 together with the 2–3 state. The output of the AND circuit 140 is applied to the OR circuit 112 to complement the S1F flip-flop 74. The other condition where the A buffer is to be used for input, as shown in FIGURE 8, is when Q is 0, indicating that the A buffer is in input status, and when the B buffer is in input status, as indicated by $DB4=0$ and $DB8=0$ lines. To this end, the output from the AND circuit 132 is applied through the OR circuit 136 to an AND circuit 142 together with the $Q=0$ line, the output of the AND circuit 142 being used to complement the flip-flop 74 through the OR circuit 112. The remaining condition, as shown by FIGURE 8, in which the A buffer is used, is when the A buffer is in input status and the contents of the E-register and the DA portion of the D-register are unequal. To this end, the output of the AND circuit 134 is also applied through the OR gate 136 to the AND circuit 142.

At the end of the 2–3 state, the central control goes either into the 2–6 or the 2–7 state. The 2–6 state is used when an input operation is called for and the 2–7 state is used if an output operation is called for. It will be seen that the P-register 80 is set to the 06 condition by the output of an AND circuit 144, while it is set to the 07 condition by the output of an AND circuit 146. Before it can be set to either the 6 or 7 condition, it must be determined that the Stop condition does not prevail. To this end, the output of the AND circuit 126 is inverted at 148 and applied to one input of an AND circuit 150. Also it must be determined that the E-register does not need to be counted up once more, and to this end the output of the AND circuit 124 is coupled through an inverter 152 to the AND circuit 150. The output of the AND circuit 150 is applied to both the AND circuits 144 and 146. Whether the input condition or the output condition is to prevail depends upon the output of the OR circuit 136. Therefore the output of the OR circuit 136 is connected to the AND circuit 144 and also inverted by an inverter 154 and applied to the AND circuit 146.

The same clock pulse at the end of the 2–3 state which sets the P-register to 6 or 7, also clears the D-register 60. It should be noted that the memory cycle was inhibited during the 2–3 state by applying the 2–3 state through an OR circuit 156 to the inhibit gate 56 to inhibit operation of the storage facility 50.

Assume that the P-register is now at 06, indicating that one of the buffers is ready for input. During 2–6, a memory cycle is initiated again from the $X=1$ column and from the even or odd buffer depending on the state of the S1F flip-flop 74. However, the read out of information by the drivers 58 into the D-register 60 is inhibited by inhibit gates 62, 64 and 66 to which the 2–6 state is applied. Thus there is a destructive read out of the prior contents of the $X=01$ column of the selected memory plane in the storage facility 50. At the completion of the memory cycle, the new window machine address in the DA portion of the D-register 60 is written into the $X=1$ column. Also during the 2–6 state, the O-register 78 is returned to the order 1 condition by the output of the OR circuit 128. The Q-register 82 is cleared except that the 8-bit is set to 1 in response to the 2–6 state which is applied through an OR circuit 166. This bit is used in order 1 to cause continued operation if no channel attention needed condition is indicated. Also the X-register 84 is set to the 02 condition in response to the 2–6 state applied through an OR circuit 168.

The 2–6 state is also used to set the contents of the DC portion of the D-register 60 to the binary equivalent of the condition 08 to establish the next order. Also the condition of the S1F flip-flop 74 is transferred to the 8-bit position of the DA portion of the D-register 60 through a gate 170 in response to the 2–6 state applied through an OR circuit 172. Thus at the completion of the 2–6 state, a new window machine address has been stored in column $X=1$ of the memory, and a new order, namely order 8, is stored in the DC portion of the D-register 60 and the condition of the S1F flip-flop 74 has been stored in the 8-bit position of the DA portion of the D-register 60.

Operation now continues back in order 1 as a result of resetting the O-register but the P-register 80 remains at 6, so the next state of the central control unit following the 2–6 state is 1–6. However, before considering this next operation, let's first cover the alternative condition under order 2 where an output operation is called for and the P-register 80 has been set to 07 instead of 06. This results in the 2–7 state as shown in FIGURE 7.

The 2–7 state is applied through the OR circuit 156 to the inhibit gate 56 to inhibit a memory cycle. The reason of course is that no new window machine address is required for an output operation, in contrast for an input operation. At the same time, the O-register 78 is set to 01, the Q-register 82 is cleared except that the 8-bit is set to 1 through the OR circuit 166, the S1F flip-flop 74 is reset to 0, the X-register 84 is set to 02 and the P-register 80 is set to 06 by the 2–7 state as applied through an OR circuit 168. The DC portion of the D-register 60 is set to binary equivalent of $DC=12$ thus establishing an order 12 for an output operation in contrast to an order 8 for an input operation as was generated in the 2–6 state. The central control unit 28, with the O-register 78 set at 01 and the P-register 80 set at 06, goes into the 1–6 state of operation.

Referring again to FIGURE 5 in which the logic for order 1 is shown, it will be seen that the 3, 6 and 7 conditions of the P-register 80 are applied to an OR circuit 170, the output of which is designated 8. Thus with the O-register 78 in condition 1 and the P-register 80 in either the 3, 6 or 7 condition, the 1–8 state prevails. During the 1–8 state, a memory cycle takes place. However, if the P-register is set at 06, the 1–6 state is applied to gate 62 so that there is a storage of the new value of the 8-bit of the DA portion of the D-register 60 which was set by the condition of the S1F flip-flop 74, designating which buffer of the buffer pair is assigned to the channel. The inhibit gate 64 is actuated in response to the 1–8 state so that the Q-count is cleared. An OR circuit 171 senses the 1–6 or 1–7 states and actuates inhibit gate 66 so that the new order contained in the DC portion of the D-register 60 is written into the $X=2$ column of the even buffer.

The 1–8 state clears the O-register 78, which is of no consequence since the O-register is already in state 1, it clears the Q-register 82 and the S1F flip-flop 74, and it is also applied through the OR circuit 83 to the AND circuit 85 to count up the S-counter 72.

It should be recalled at this point that during the 2–1 state of order 2, the attention needed flip-flop in the channel control was turned off by the RCCS signal from the OR circuit 117. If none of the other channels require attention at this time, the output of the AND circuit 86 will not be true. However, if one of the other channels does need attention, the output of the AND circuit will be true and therefore the output of the AND circuit 86 will cause the S-counter 72 to be counted up one at the end of the 1–8 state. In this way the other channels get attention before further operation takes place with the present channel.

An AND circuit 172 senses the 1–8 condition and also senses if $Q8=1$ and $Q4=0$. It will be recalled that $Q8=1$ was set during the 2–6 or 2–7 states to cause continued operation in the same channel if no other channel needed attention. If all conditions are true, the output from the AND circuit 172 generates a signal, designated SCAS, which is used to again turn on the ANF flip-flop 42 in the designated channel control unit.

The output from the AND circuit 172 is applied to two other AND circuits 174 and 176. The ACANS level is applied also to the AND circuit 174 and is applied through an inverter 178 to the AND circuit 176. Thus if no attention is needed from any of the channels, the output of the AND circuit 176 will be true. If attention is needed by one of the channels, then the output of the AND circuit 174 will be true. If attention is needed by one of the channels at this time, the output of the AND circuit 174 acts to clear the P-register 80 and the X-register 84, thus returning operation to the 1–0 state described above. This results in a scanning operation by the S-counter to find another channel in sequence which needs attention. However, if all of the attention needed flip-flops are off so that the ACANS signal is not true, the output of the AND circuit 176 sets the P-register 80 to 1 through the OR circuit 90 and sets the X-register 84 to 02, thereby placing the central control unit directly into the 1–1 state described above in which the order is read directly out of the buffer into the D-register 60. It will be noted that because the S-counter 72 has not been changed in the latter case, the order that was just generated and stored during the 2–6 or 2–7 state, namely, order 8 or order 12 is again returned to the D-register 60 during the 1–1 state. By this arrangement, it is possible to go directly from the 1–6 state into the 1–1 state without going through a scanning operation of the S-counter where none of the other channels requires attention.

If both Q4 and Q8 are 0 during the 1–8 state, as sensed by an AND circuit 179, the P-register 80 is cleared and the X-register 84 is cleared. This would be the normal condition where some order other than order 2 has been completed.

In summary of orders 1 and 2, it will be seen that order 1 is used to scan the channels to find a channel that needs attention and for initiating an order from the associated buffer in the storage facility. If no order has been stored, order 2 is automatically entered, the status of the two buffers is examined and unless both buffers are in system status, either an input order 8 is established or an output order 12 is established and stored in a designated one of the buffers. Also the window machine address is modified if the designated buffer is read for input. At the end of the order 2 as well as at the end of many other orders, the central control unit returns to order 1 with the P- register 80 at 3, 6 or 7. If some other channel needs attention, the S-counter is counted up until the new channel needing attention is designated and the operation is repeated. Otherwise the order set up during order 2 is immediately recalled and loaded into the O-register 78.

Once a window machine address has been assigned and either an order 8 or an order 12 has been stored in the assigned buffer, when the same buffer is again designated during an order 1 operation, an order 8 or order 12 will be loaded into the O-register 78 during the 1–1 state described above. The operation of the central control unit in executing orders 8 and 12 is shown in FIGURE 9, as is also order 9. The function of order 9 will be described hereinafter. During order 8, the central control unit polls for input from the assigned window machine. This is done by sending a three character message by means of the channel control unit over the transmission line to the remote station. The three characters are respectively a window machine address, a code number which for an input poll is code 12, and a parity check character. Since the logic shown in FIGURE 9 is common to the three orders 8, 9 and 12, these output leads from the O-register 78 are connected to an OR circuit 190 having an output level designated T. Therefore the T level is common to all three orders. Since the P-register 80 is initially 0, the common state for all three orders is T–0. During the T–0 state, a memory read cycle from the storage facility 50 is initiated. As pointed out in the description of the order 1 operation, during the 1–1 state, the X-register 84 was cleared but then set to the 01 state if the contents of the DB portion of the D-register 60 were equal to 0. The DB portion of the D-register 60 is 0 during the 1–1 state only if the Q-count section of the word in the $X=02$ position of the associated channel is 0. The Q-count will not be 0 if a particular order has already been executed at least once. For example, order 8 must be executed four times, three times to send the three separate characters for an input poll to the remote station and a fourth time to complete the operation. The central control unit returns to order 1 each time order 8 or any other order is executed once and subsequent executions of a particular order are initiated only after the other channels have been serviced and operation returns to the same designated channel again.

Bearing this in mind, the first time that order 8 is executed, the X-register 84 will be in the 01 condition so that the memory cycle reads out the word in the $X=01$ column of the designated buffer. As shown in FIGURE 6, this word now contains the assigned window machine address as well as the status-4 and status 8-bits. If the Q-count is not 0, the X-register is in the 00 condition and the parity character is read out to the D-register 60.

A decoder 192 determines the Q-count as stored in the Q-register 82 during the 1–1 state. When the orders 8, 9 and 12 are first executed, the Q-count is 0 and $Q=0$ level is true. Under these conditions, the window machine address in the D-register 60 is held and not cleared at the end of the T–0 state. To this end, an AND circuit 194 has the T–0 state applied thereto through an OR circuit 196 together with the $Q=0$ line. The output of the AND circuit 194 is applied to the inhibit gate 70 to inhibit clearing of the D-register 60 at the end of the T–0 state. The clock pulse at the end of the T–0 state transfers the window machine address in the DA portion of the D-register 60 to the E-register 106 through the gate 110.

If the Q-count is in the $Q=1$ state, the order is executed for the second time and the code character is loaded into the DA portion of the D-register 60 in place of the window machine address. To this end, the $Q=1$ state is applied to an AND circuit 198 together with the 8–0 state for order 8, the output of the AND circuit 198 setting the DA portion of the D-register 60 to the binary equivalent of the code number 12. Similarly, an AND circuit 200, in response to the 12–0 state for order 12 and the $Q=1$ condition of the Q-register 82, sets the DA portion of the D-register 60 to the binary equivalent of the code number 14. For order 9, an AND circuit 202 during the 9–0 state sets the DA portion of the D-register 60 to the code number 15.

To generate the parity character during the third time the orders 8, 9 and 12 are executed, it is necessary to complement the contents of the DA portion of the D-register 60. To this end, an AND circuit 204 senses the $Q=2$ condition during the T–0 state, the output of the AND circuit 204 operating to complement all four bits stored in the DA portion of the D-register 60.

At the end of the T–0 state, the P-register 80 is set to the 01 condition, establishing the T–1 state. The T–1 state is applied to the inhibit gate 56, so that no memory cycle is initiated. The T–1 state sets the RCCS level from the OR circuit 117 to the channel control units for turning off the ANF flip-flop 42 in the designated channel. Also the T–1 state acts to clear the X-register 84. If the Q-count is 0, the D-register 60 is not cleared since the T–1 state is applied to the OR circuit 196 to operate the inhibit gate 70. To provide a parity check, during all but the $Q=0$ count condition, the contents of the E-register 106 and the DA portion of the D-register 60 are applied to a binary half adder 206 and the resulting binary coded character is loaded back into the DA portion of the D-register 60 through a gate 208 which is controlled by an AND circuit 210 in response to the T–1 state and the $Q=0$ state applied through an inverter 212 to the AND circuit 210.

Except on the final Q-count, namely, $Q=3$, the P-register 80 is set to the 03 condition during the T–1 state by means of an AND circuit 214 to which the $Q=3$ state is applied through an inverter 216. An AND circuit 218 sets the P-register 80 to the 07 condition in response to the $Q=3$ condition of the Q-register 82 and the T–1 state. An AND circuit 220 is also responsive to the T–1 state whenever the Q-register 82 is in the $Q=0$, 1 or 2 state, i.e., $Q \neq 3$. To this end, the $Q=3$ level is applied through an inverter 222 to the AND circuit 220. The output of the AND circuit 220 goes to each of the channel control units and is designated as the SCIS signal. As will be seen in the further description of the channel control unit of FIGURE 2, the SCIS level operates to transfer a character from the D-register 60 to a register in the designated control unit. A Z-counter 224 operates a gating circuit 226 to selectively connect one of the three sections, DA, DB, or DC of the D-register 60 to the channel control units over the output line DI. During the 8, 9 and 12 orders, the Z-register is cleared so that the DA portion of the D-register 60 is coupled by the gating circuit 226 to the DI line. During the Q0, 1 and 2 counts, the window machine address, the code number, and the parity character respectively are transferred from the D-register 60 to the designated control unit by the SCIS level produced during the T–1 state.

When the P-register 80 is advanced to 03 to establish the T–3 state, the O-register 78 is cleared to re-establish order 1, the S1F flip-flop 74 is reset to 0, the Q-register 82 is reset to 0, and the X-register 84 is set to the $X=02$ condition. Also during the T–3 state, the count condition of the Q-register 82 is counted up one by a delay pulse through a gate 277. The new count in the Q-register 82 is transferred by a gate 228 into the DB portion of the D-register 60.

During the T–3 state, a memory cycle is initiated but the T–3 level is applied to the inhibit gate 62 so that the contents of the DA portion of the D-register 60 are written into the parity character position of the control word stored in the $X=00$ column of the selected buffer.

It will be noted that at the completion of the execution of the orders 8, 9 and 12 during the Q0, 1 and 2 count conditions, the central control unit goes from the T–3 state into the 1–3 state, namely, the condition described in connection with FIGURE 5 in which the O-register 78 is in order 1 and the P-register 80 is in the 03 condition.

With reference to FIGURE 5, it will be seen that during the 1-3 state, which establishes the 1-8 state through the OR circuit 170, the inhibit gate 64 is operated so that the DB portion of the D-register 60 is written into the Q-count character position of the word in the $X=02$ column of the selected buffer. In this way, each time an order 8, 9 or 12 is executed, the Q-count is up-dated in the control word-stored in the $X=02$ position of the even buffer for the selected channel.

On the fourth time that the orders 8, 9 and 12 are executed, the Q-register will be in the $Q = 3$ condition during the T-1 state. This sets the P-register 80 to the 07 condition. Since the input poll or the output poll to the remote station has now been completed, it is necessary to establish the next order and put the channel control into condition to receive a response to the input poll or the output poll.

During the T-7 state, a memory cycle is executed but the T-7 state is applied to the inhibit gate 62 so that the parity character is up-dated. Again the order register 78 is reset to order 1 and the Q-register 82 is cleared. The X-register 84 is set to the 02 condition. Also if an order 8 is stored in the O-register 78, the 8-7 state sets the binary equivalent of a 10 into the DC portion of the D-register 60, establishing the next order to be executed in connection with the particular channel. Similarly, the 9-7 state sets the binary equivalent of the number 11 in the DC portion of the D-register 60 while the 12-7 condition sets the binary equivalent of the number 14 in the DC portion of the D-register 60.

In addition, the T-7 state through an OR circuit 229 provides a SDSS signal to the channel control units. The function of this signal will be described hereinafter in connection with a detailed description of the channel control unit shown in FIGURE 2.

With the order register 78 reset to 01, operation returns to the 1-7 state of the order operation described above in connection with FIGURE 5. It will be noted in connection with FIGURE 5, that during the 1-7 state, a memory cycle takes place in which the contents of the DC section of the D-register 60 are stored in the $X=2$ word position of the even buffer associated with the particular channel. Thus the next time the channel needs attention, an order 10, 14 or 15 will be encountered. In particular, if an order 8 has been executed as described above to poll for input, an order 10 will be subsequently encountered for the same channel, the function of order 10 being to receive a response to the input poll from the remote station. Similarly, if an order 12 was previously executed sending an output poll, the order 14 will be next encountered which sets operation for receiving a response to an output poll from the remote station.

Referring to FIGURE 10, the logic circuitry for the central control unit in executing orders 10, 14 and 15 is shown. When the remote terminal unit receives an input poll or an output poll, if it has properly received the message and is ready to transmit or receive information, the remote station first returns a response message to the poll. This response message includes the window machine address as a first character, a code number as the second character, and finally a parity character. The code character for a good response, indicating that the remote terminal unit is ready for input, is a code 12. The code number for a good response indicating that the remote terminal unit is ready to receive information from the central station is a code 14. A code 11 response is used to indicate that there was an error in the polling operation or the addressed window machine is not ready to send or receive information. If a code 11 response is received, operation is returned to order 1 and a new window machine address is assigned.

Once the remote station sends the window machine address back to the channel control unit, the ANF flip-flop 42 is set. After servicing the other channels, the central control unit by means of the S-counter 72 again designates the particular channel from which a response to the input poll or output poll is being received. With the received window machine address character loaded in the channel control unit and the ANF flip-flop 42 set, order 1 is repeated and as a result, order 10 or order 14, depending upon whether an input poll or an output poll was initiated, will be loaded in the O-register 78 and the P-register 80 will be 0, as will the count of the Q-register 82. The 10, 14 and 15 lines from the O-register 78 are combined in an OR circuit 230, the output of which is designated R. Thus the R state applies for orders 10, 14 and 15 throughout the logic diagram of FIGURE 10.

During the R-0 state, a memory cycle is initiated. It will be noted that if the Q-count is 0, the X-register 84 was set to 01 and if Q is not 0, the X-register was set to 00 during the 1-1 state, as described above in connection with FIGURE 5. Assuming the Q-count is 0 so that the order is being executed for the first time, the D-register 60 is loaded by the memory cycle with the window machine address and the status bits. The clock pulse at the end of the R-0 state transfers the window machine address from the DA portion of the D-register 60 to the E-register 106 through the AND circuit 110. The CIPS level is present from the channel control unit if the first character has been received from the remote station. The CIPS signal is applied to an AND circuit 232 together with the R-0 state for operating a gate 234 for transferring the character from a character register in the designated channel control unit to the DA portion of the D-register 60. The R-0 state sets the P-register 80 to the 01 condition.

During the R-1 state of the central control unit, no memory cycle takes place, the R-1 state being applied to the inhibit gate 56. The R-1 state is applied to the OR circuit 117 to provide the RCCS signal to reset the ANF flip-flop 42 in the channel control unit. At the same time, the R-1 state sets the X-register 84 to 0. If the Q-count is 0, the $Q=0$ and R-1 conditions are applied to an AND circuit 236 for turning on the inhibit gate 70 to prevent the D-register 60 from being cleared. Thus the received window machine address character is retained. If the Q-count is one, i.e., not equal to 0, the DA portion of the D-register 60 contains the code character received, but the parity character from the control word read out of memory during R-0 has been loaded in the E-register 106. By means of the binary adder 206, the resultant sum is reloaded into the DA portion of the D-register 60 by means of the gate 208 in response to the R-1 condition and the $Q{\neq}0$ output of the inverter 212. This is the same as the parity operation described above in connection with orders 8, 9 and 12.

If $Q=0$, so that the received window machine address is in the DA portion of the D-register 60 and the stored window machine address derived from the buffer is in the E-register 106, a check is made to see if they are the same. The comparison circuit 118 compares the contents of the DA portion of the D-register 60 and the E-register 106 to determine whether they are equal or unequal. If the two characters are not the same, an error is recorded in the 4-bit position of the Q-register 82 by means of an AND circuit 240 to which the R-1 state is applied together with the $Q=0$ and the $DA{\neq}E$ condition from the compare circuit 118. This is an error condition which sets the 4-bit position to the $Q4=1$ condition.

Another error condition exists in the $Q=1$ count condition of the Q-register 82 if the code number received from the remote station is not an 11 or a 12 in the case of order 10, or is not an 11 or a 14 in the case of order 14. This error condition is also established during the R-1 state by means of a decoder 242 coupled to the output of the DA portion of the D-register 60. Depending upon the code number received from the remote station, either the $DA=11$, the $DA=12$, or the $DA=14$ line should be true. The $DA=12$ lines are applied to an OR circuit 244, the output of which is inverted by an inverter 246 and applied as one input to an AND circuit 248 together with the 10–1 state. The output of the AND circuit 248 is applied through an OR circuit 250 to another AND circuit 252 together with the $Q=1$ level and the R–1 state. The output of the AND circuit 252 also sets the 4-bit flip-flop of the Q-register 82 to the $Q4=1$ condition to indicate an error.

Similarly, the $DA=11$ and the $DA=14$ lines are applied to an OR circuit 254, the output of which is inverted by an inverter 256 and applied to an AND circuit 258 together with the 14–1 state. The output of the AND circuit 258 is applied through the OR circuit 250 to the AND circuit 252 for establishing the error condition in the 4-bit flip-flop of the Q-register 82.

As pointed out above, if a code 11 is received instead of a code 12 in response to an input poll or a code 14 in response to an output poll, this indicates that the addressed window machine is not prepared to send information or to receive information. This condition is checked during the R–1 state by an AND circuit 260 to which is applied the $Q=1$ level, the R–1 state and the $DA=11$ condition from the decoder 242. If the output of the AND circuit 260 is true, it sets the 8-bit flip-flop of the Q-register 82 to the $Q8=1$ condition.

The CIPS level is generated by the channel control unit with each character received from the remote station. After the third and last character, a CDSS level is received from the channel control unit. Thus for $Q=0$ through $Q=2$, the CDSS signal will not be present. This condition is sensed by an AND circuit 262 to which the R–1 state is applied and to which the CDSS signal is applied through an inverter 264. The output of the AND circuit 262 sets the P-register 80 to the 03 count condition. After the three characters have been received, the CDSS signal goes true. This is sensed by an AND circuit 266 to which the R–1 state is also applied. The output of the AND circuit 266 sets the P-register 80 to the 07 condition.

Considering first the R–3 state of the central control unit as shown in FIGURE 10, a memory cycle takes place. The R–3 state is applied to the inhibit gate 62 so that the character stored in the DA portion of the D-register 60 is written into the parity portion of the control word in the $X=00$ position of the designated buffer. The R–3 state is also used to reset the O-register 78 to order 1, to transfer the contents of the Q-register 82 through a gate 268 into the DB portion of the D-register 60 and clear the Q-register 82, and also to set the X-register 84 to the $X=02$ condition. With the O-register 78 now in the 01 condition and the P-register 80 in the 03 condition, operation continues in the 1–3 state described above in connection with FIGURE 5 in which the Q-count is changed and the control word stored in the $X=02$ condition of the even buffer.

The above operation is repeated for each character until the three characters are received from the remote station in response to the input poll or the output poll. The fourth time orders 10 or 14 are entered and the Q-count is now $Q=3$, as mentioned above, the CIPS signal will not be on since the three characters have already been received and no further characters should be received. However, the CDSS signal will now be true as received from the channel control unit. Thus during the R–1 state, the P-register 80 is set to the 07 condition by the output of the AND circuit 266. It should be noted that if during any execution of the orders 10 or 14, the Q4-bit has been set, indicating an error and/or the Q8-bit has been set indicating a code 11, this condition is stored as part of the Q-count and is therefore present in the Q-register when the $Q=3$ count condition prevails, namely, when the fourth execution of the order 10 or 14 is initiated.

During the R–7 state, the $Q=3$ condition is sensed by an AND circuit 270 to which also is applied the $Q4=0$ and the $E=15$ condition from the E-register 106. The $Q4=0$ indicates no error and the $E=15$ indicates that there is no parity error. The output from the AND circuit 270 indicates that a good response has been received and is designated GRRS. The output of the AND circuit is also applied to an inverter 272 to indicate that a good response has not been received and that an error exists, as designated by the line ERRS out of the inverter 272.

If there has been a good response but a code 11 was received, in order 14 it is necessary to clear the $X=00$ position of the buffer. This is accomplished by an AND circuit 274 to which the 14–7 state is applied together with the GRRS signal from the AND circuit 270 and the $Q8=1$ condition from the Q-register 82. The $Q8=1$ condition was set in response to a code 11 during the R–1 state of the central control unit. The output of the AND circuit 274 is applied to the inhibit gates 62, 64 and 66 to cause a destructive read out memory cycle. In the event the output of the AND circuit 274 is not true, the memory cycle is inhibited by applying the output of the AND circuit through an inverter 276 to the inhibit gate 56.

If the proper code response was received so that $Q8=0$ is true, or if there was an error response in the execution of order 14, operation is returned to order 1. To this end, an AND circuit 278 senses the R–7 condition, the $Q8=0$ condition and the GRRS condition, the output of the AND circuit 278 being used to reset the O-register 78 to the 01 condition, clear the Q-register 82 and set the X-register 84 to the 02 condition. Since the P-register 80 remains unchanged, the 1–7 state of the central control unit, described above in connection with FIGURE 5, is entered.

Similarly, an AND circuit 280 senses the error condition ERRS and the 14–7 condition. The output of the AND circuit 280 also resets the O-register 78 to 01, while clearing the Q-register 82 and setting the X-register 84 to $X=02$ condition. Also if a good response has been received and the proper code number returned from the remote station, the output of the AND circuit 278, being true, is used to set the DC portion of the D-register 60 to the next order. In the case of order 10, the next order is order 9 in which the central control unit sends a "transmit" order, designated by a code 15, to the remote station. In the case of an order 14, the next order is order 13 in which a segment of information is transmitted from the buffer to the remote station.

To accomplish this, the output of the AND circuit 278 is applied to an AND circuit 282 together with the order 10 condition. The output of the AND circuit 282 sets the DC portion of the D-register 60 to the binary equivalent of the number 9. The output of the AND circuit 282 is also connected as a control signal to the designated channel control unit as the SDDS and SCRS signals described hereinafter in more detail in connection with FIGURE 2.

During an order 14 for receiving a response to an output poll, an AND circuit 284 senses the 14 condition of the O-register 78 and the output of the AND circuit 278. The output of the AND circuit 284 sets the DC portion of the D-register 60 to the binary equivalent of the number 13, thus establishing the next order as order 13. The output of the AND circuit 284 is also used to set the 8-bit of the Q-register 82 for use in the 1–7 state as described above in connection with FIGURE 5.

If there is not a good response and the order is 14, as sensed by the AND circuit 280, the 8-bit of the Q-register 82 is also set to 1, so that polling will continue. As pointed out above, if there is a good response with a code 11 during order 10, it is desirable to clear the buffer. The control word in the $X=00$ position of the buffer was cleared as described above. In order to clear the $X=01$ position of the buffer, during the R–7 state, the $Q8=1$ and GRRS conditions are sensed by an AND circuit 286. The output of the AND circuit 286 sets the P-register 80 to the 06 condition and the X-register 84 to the $X=01$ condition.

During the R–6 condition, a memory cycle is initiated but the R–6 condition is applied to the inhibit gate 64. In this manner, the status buits which are normally transferred to the DB portion of the D-register 60 are cleared to 0, placing the buffer in the status for input polling. During the R–6 condition, the O-register 78 is reset to the 01 condition, the P-register 80 is set to the 07 condition, the Q-register 82 is cleared except that the 8-bit is set to 1 to indicate a continuation of polling. Operation of the central control unit then goes forward in the 1–7 state described above in connection with FIGURE 5.

The execution of order 9, which follows a good response to an input pole, was described in detail in connection with FIGURE 9 and is substantially the same as orders 8 and 12. A window machine address followed by a code 15 character and followed by the parity character is transmitted to the remote station by order 9, indicating to the remote station that the information should be transmitted from the window machine to the assigned buffer in the central control unit. During the 9–7 state, the DC portion of the D-register 60 is set to the binary equivalent of the number 11 to establish order 11 as the next order.

The logic for order 11 is shown in FIGURE 11. During order 11, the assigned buffer is loaded with information received from the window machine at the remote station through the associated channel control unit. With the O-register 78 loaded with order 11 following execution of order 1, and the P-register 80 reset to 0 and the X-register 84 set to 01, the central control unit enters the 11–0 state during which a memory cycle is initiated, loading the D-register 60 with the window machine address and status bits from the assigned buffer in the storage facility 50. The clock pulse at the end o fthe 11–0 state transfers the window machine address in the DA portion of the D-register 60 into the E-register 106 through the gate 110. If the Q-count in the Q-register 82 is 0, indicating that order 11 is being executed for the first time, the X-register 84 is set to 3 by the output of an AND circuit 290 to which the $Q=0$ level derived from the decoder 192 together with the 11–0 state are applied. The first character, a window machine address, which has been loaded into the single character register in the channel control unit, is transferred by means of the gate 234 to the DA portion of the D-register 60 during the 11–0 state. The gate 234 is controlled by an AND circuit 292 to which is applied the 11–0 state and a CIPS signal which indicates that channel information is present in the channel control unit and the $Q=0$ condition connected through an OR circuit 294.

It should be noted that the order 11 is executed for each character transferred from the remote station. The first character, when the Q-count is 0, is the window machine address and this is followed by thirty-eight additional characters, the last of which is a parity character. On executing order 11 with the Q-count$\neq$0, the characters are distributed in sequence from the channel control unit to the DA portion and then to the DB portion and finally to the DC portion of the D-register 60. This is controlled by the Z-counter 224. As shown in FIGURE 6, the values of the Z-counter and the X-register 84 are stored in the DC and DB portions respectively of the control word as loaded into the D-register 60 from the $X=00$ position of the buffer. It will be clear that in connection with the description of the 1–1 state as described above in connection with FIGURE 5, the X-register is set to 01 if the Q-count is 0 and set to 00 if the Q-count is not 0. Thus in the 11–0 state, the memory cycle loads the control word from the $X=01$ position to provide the window machine address and status bits for $Q=0$, but reads out the control word from the $X=00$ position to provide the parity check character and the X and Z address information when the Q-count is not 0.

Assuming the Q-count is not equal to 0, the Z-counter 224 is set by the contents of the DC portion of the D-register 60 through a gate 296 in response to the 11–0 state and the $Q\neq0$ condition as applied through an AND circuit 298 to the gate 296. Similarly, the X-register 84 is set to the value of the number in the DB portion of the D-register 60 through a gate 300 in response to the 11–0 state and the $Q\neq0$ condition as applied through an AND circuit 302 to the gate 300.

Whenever the Q-count is other than 0, the character transferred from the channel control unit is loaded into one of the three portions of the D-register 60 as determined by the Z-count condition as stored initially in the DC portion of the D-register 60 during the 11–0 state. A decoder 304 connected to the DC portion of the D-register 60 selects one of three outputs designated $DC=0$, $DC=1$, and $DC=2$. For $DC=0$, the character on line CB from the channel control unit is transferred to the DA portion of the D-register 60 through the gate 234. To this end, the $Q\neq0$ condition and the $DC=0$ conditions are applied to an AND circuit 306, the output of which is applied through the OR circuit 294 to the AND circuit 292. Similarly, a gate 308 couples the character on the CB line from the channel control unit to the DB portion of the D-register 60 during the 11–0 state when the $DC=1$ condition exists and the $Q\neq0$, and there is a CIPS signal present, as sensed by an AND circuit 310. A gate 312 transfers the character to the DC portion of the D-register 60 during the 11–0 state if the $DC=2$ condition prevails, $Q\neq0$ and a CIPS signal is present as sensed by an AND circuit 314.

The 11–0 state is applied to the P-register 80 to set it in the 01 condition thereby setting the central control unit to the 11–1 state. During this state, a memory cycle is again initiated, but the Z-counter 224 inhibits read out into the selected portion of the D-register 60 so that in effect the character loaded in the D-register 60 during the 11–0 state is now written into the buffer portion of the storage facility 50 designated by the X-register 84. The 11–1 state and $Z=0$ conditions are applied to an AND circuit 308, the output of which is coupled through an OR circuit 309 to the inhibit gate 62. Similarly, the 11–1 state and $Z=1$ conditions are applied to an AND circuit 310, the output of which is coupled through an OR circuit 311 to the inhibit gate 64. The 11–1 state and $Z=2$ conditions are applied to an AND circuit 312, the output of which is coupled through an OR circuit 313 to the inhibit gate 66.

During the 11–1 state, the reset channel control signal RCCS is generated by the OR circuit 117. If the Q-count is 0, it is necessary to hold the window machine address in the DA portion of the D-register 60. To this end, the 11–1 state and the $Q=0$ condition are applied to an AND circuit 316 for operating the inhibit gate 70, thereby preventing the clearing out of the D-register 60 by the clock pulse. If $Q\neq0$, the contents of the DA portion of the D-register 60 is added to the parity character in the E-register 106 by means of the adder 206, the output of the adder being reinserted in the DA portion of the D-register 60 through the gate 208 in response to the 11–1 state and the $Q\neq0$ condition applied through an AND circuit 318. Thus a new parity check character is generated each time the order 11 is executed.

An error check is made between the window machine address derived from the buffer and loaded in the E-register 106 and the window machine address received from the remote station and loaded in the DA portion of the D-register 60 during the $Q=0$ count. The comparison is done by the compare circuit 238. If the output of the compare circuit 238 sets $DA\neq E$, an error is indicated. This condition is stored in the 4-bit position of the Q-register 82 by means of an AND circuit 320 which senses the 11–1 state, the $Q=0$ condition, and the $DA\neq E$ condition.

With the Q-count at 0, the Q-register 82 is advanced to the $Q=1$ condition during the 11–1 state. To this end, an AND circuit 322 senses the $Q=0$ condition and the 11–1 state and sets the 1-bit in the Q-register 82. Also during the 11–1 state, the Z-counter 224 is counted up one by means of a delay clock applied through a gate 323. The Z-counter is arranged to generate an overflow pulse when it is counted from the $Z=2$ condition back to the $Z=0$ condition. The overflow pulse is used to count up the X-register 84. In this way, the X-register is counted up to select the next column in the buffer after the Z-counter is counted through its three count conditions. When the X-register 84 reaches the $X=15$ condition and the Z-counter 224 is in the $Z=2$ condition, the last character, namely, the parity character, has been loaded into the D-register 60 from the window machine in the remote station. This condition is sensed by an AND circuit 324 which sets the 2-bit in the Q-register 82, thereby setting the Q-count to $Q=3$ during the 11–1 state. During the 11–1 state the contents of the Z-counter, after being counted up one by the delay clock, are transferred to the DC portion of the D-register 60 through a gate 325, while the contents of the X-register are transferred to the DB portion of the D-register 60 through a gate 327.

After the last character has been received and loaded into the buffer by the order 11, the order 11 is repeated again but now the CDSS signal is active and the CIPS signal is turned off by the channel control unit. On all prior executions of the order 11, an AND circuit 326 to which the 11–1 state is applied, senses that the CDSS signal is not true by means of an inverter 328. The output of the AND circuit 326 sets the P-register 80 into the 03 condition, thereby setting the central control unit to the 11–3 state. An AND circuit 330 senses when the CDSS signal is true during the 11–1 state and sets the P-register 80 to the 07 condition.

Considering first the 11–3 state which is entered on all but the last execution of the order 11, a memory cycle takes place, but the 11–7 state is applied to the inhibit gates 62, 64, and 66 through an OR circuit 329 so that the new Z and X information and parity check character in the D-register 60 are loaded into the $X=00$ column position of the buffer in the storage facility 50.

Also during the 11–3 state, the X-register 84 is set to 02, the contents of the Q-register 82 is loaded into the DB portion of the D-register 60 through a gate 332 and the O-register 78, Q-register 82 and S1F flip-flop 74 are cleared so that the central control unit goes back into the 1–7 condition which pertains at the completion of the execution of each order.

On the last execution of the order 11 when the central control unit goes into the 11–7 state, again a memory cycle is initiated but the inhibit gates 62, 64, and 66 are activated through the OR circuit 329 so that the contents of the D-register 60 are written into the $X=00$ column of the buffer. The 11–7 state is applied to the X-register 84 to set it to the $X=01$ condition. Again a good response signal GRSS is produced by the AND circuit 270 in response to the $Q=3$ count condition, the $Q4=0$ condition indicating that no error bit was stored in the Q-register 82 and the $E=15$ condition from the E-register 106 indicating that there was no parity error. If a good response signal is present during the 11–7 state as sensed by an AND circuit 334, the output of the AND circuit sets the 4-bit in the DB portion of the D-register 60 to 1, thereby establishing the status bit indicating a System Status condition which signals that the buffer is loaded and is ready to communicate with the processor. The output of the AND circuit 334 is also used to set the P-register 80 to the 06 condition.

During the 11–6 state, a memory cycle is initiated but again the 11–6 state is used to inhibit the gates 62, 64, and 66. Thus the status 4-bit in the DB portion of the D-register 60 is written into the $X=01$ column of the buffer in the storage facility 50. The 11–6 state is used to clear the O-register 78 and the Q-register 82 and the S1F flip-flop 74. At the same time, the 11–6 state sets the 8-bit in the Q-register 82 to continue polling when the central control unit returns to order 1.

Order 11 completes operation on a particular buffer when polling for an input. Therefore no new order is loaded into the $X=02$ column during the 11–6 state. Thus on returning to order 1, an order 2 will be generated to assign a new window machine address to that buffer.

It will be recalled that when doing an output poll after executing an order 14 and receiving a good response to an output poll, an order 13 was stored in the order portion of the word in the $X=02$ position of the buffer. Order 13, the logic of which is described in connection with FIGURE 12, is used to send an output segment from the buffer to the remote station for printout by the window machine.

Once the buffer is loaded with information from the remote station, and the status 4-bit set to indicate that system attention is called for, the buffer can be read into the processor and the buffer then reloaded by the processor for transmission during an output poll to the window machine at the remote station. Transfer of information between the buffer storage and the processor is done in a conventional manner under control of the processor and forms no part of the present invention. The information is relayed from the buffer back to the window machine by execution of order 13. Information is relayed in segments which may be either three characters in length or fifteen characters in length for example. The three character segment includes as the first character the window machine address, a code number, called the motor bar code, which is used to position the carriage in the window machine, and a parity character. The fifteen character segment is the same except that there are twelve information characters inserted between the code character and the parity character.

With this in mind, when an order 13 is established following an order 14 in which a response to an output poll is received, the order register 78 is set to 13 and the P-register 80 is set to 0 so that the central control unit is in the 13–0 state. As always at the start of an order established by an order 1 operation, the X-register is in the 01 condition if the Q-count is 0 and is in the 00 condition if the Q-count is not 0. Thus the memory cycle loads the D-register 60 initially with the window machine address and the status bits. The status bits are of no interest at this time but the window machine address in the DA portion of the D-register 60 is transferred to the E-register 106 through the AND gate 110 by the 13–0 state. If the Q-count is 0, an AND circuit 340 operates the inhibit gate 70 to hold the window machine address in the D-register 60. The P-register 80 is set to 1 in response to the 13–0 state.

During the 13–0 state, when the Q-count is not 0, the control word in the $X=00$ position of the buffer is loaded into the D-register 60. Initially the Z-count and the X-count in the control word are 0. The decoder 304 senses that the Z-count in the DC portion of the D-register 60 is 0, setting a $DC=0$ level. Similarly, a decoder 342 senses that the contents of the DB portion of the D-register 60 is 0, setting a $DB=0$ level. These two levels are sensed by an AND circuit 344 together with the $Q\neq0$ and 13–0 conditions, the output of the AND circuit 344 setting the X-register to the 03 condition.

If the Q-count is not 0 or 14 or 15, this means a code or data character is being transmitted. If the Q-count is 0, the window machine address is being transmitted, while if the Q-count is 14, the parity character is being transmitted, and if the Q-count is 15, no character is being transmitted during order 13. The $Q=0$, the $Q=14$ and the $Q=15$ signals are applied to an OR circuit 346 and the output of the OR circuit 346 is applied to an inverter 348 so that the output of the inverter 348 indicates that the Q-count is other than 0, 14 or 15. The output of the inverter 348 together with the 13–0 state is applied to an AND circuit 350 for operating the gate 300 to transfer the contents of the DB portion of the D-register 60 to the X-register 84 to set up the address of the proper column in the buffer in the storage facility 50. The output of the AND circuit 350 also operates the gate 296 so that the contents of the DC portion of the D-register 60 are loaded in the Z-counter 224 during the 13–0 state.

In the 13–1 state, a memory cycle is inhibited if the Q-count is 0, 14, or 15. To this end, the output of the OR circuit 346 is applied to the inhibit gate 56 through an AND circuit 352 together with the 13–1 state. During the 13–1 state, the channel reset signal RCSS is provided at the output of the OR circuit 117, and the X-register 84 is cleared. Also if $Q=0$, the output of the AND circuit 340 inhibits clearing of the D-register 60. If $Q \neq 0$, a parity check character is generated by adding the contents of the E-register 106 to the contents of the DA portion of the D-register 60 with the adding circuit 206 and loading the result back in the DA portion of the D-register 60 through the gate 208.

If the Q-count is not 0, 14 or 15, the Z-counter 224 is counted up one by the delayed clock pulse applied through the gate 323. The gate is controlled by the output of an AND circuit 354 to which the 13–1 state is applied together with the output of the inverter 348. The output of the AND circuit 354 also is applied to the gate 225 to transfer the counted up condition of the Z-counter 224 to the DC portion of the D-register 60. Also the output of the AND circuit 354 is applied to the gate 327 to transfer the contents of the X-register 84 to the DB portion of the D-register 60.

As mentioned above, the segment to be relayed to the remote station may either have fifteen characters or three characters. To signal which condition prevails, the 1-bit in the motor bar character which is relayed during the Q-count $Q=1$, i.e., the second character in the message, is 0 or 1. The 1-bit being equal to 0 indicates only three characters are to be relayed and is sensed at the output of the gating circuit 226 by which one of the three characters in the D-register 60 is gated to the output DI going to the channel control unit. An AND circuit 358 senses that the Q-count is $Q=1$ and that it is the 13–1 state together with the 1-bit=0 condition from the gating circuit 226. If the output of the AND circuit 358 is true, the Q-counter is set to $Q=13$, thereby jumping over the intermediate Q-count conditions between 1 and 13. Thus the next time order 13 is executed, it will be in the $Q=14$ condition. At the same time, the output of the AND circuit 358 sets the 8-bit of the DB portion of the D-register 60 to store the fact that no data is to follow.

In order to transfer the characters from the D-register 60 to the channel control unit, the 13–1 state is applied to the AND circuit 220 and the $Q=15$ is applied through the inverter 222 to the AND circuit 220 to provide a send channel information signal SCIS to the channel control unit in all but the last or $Q=15$ execution of order 13. If $Q \neq 15$, an AND circuit 360 in response to the 13–1 state sets the P-register 80 to the 03 condition. Once the Q-count reaches 15, an AND circuit 362 sets the P-register 80 to the 07 condition.

During the 13–3 condition, a memory cycle is initiated. If the Q-count is 0, 14 or 15, the contents of the DA portion of the D-register 60 are written into memory by applying the 13–3 state to the inhibit gate 62. For any other Q-count condition, the entire word in the D-register 60 is written into the storage facility 50. To this end, an AND circuit 326 senses the 13–3 state and senses the output of the inverter 348. The output of the AND circuit 326 is applied to all three inhibit gates 62, 64 and 66. During the 13–3 state, the Q-register 82 is counted up one by the delayed clock pulse applied to the gate 277. The contents of the Q-register 82 are then transferred by the clock pulse at the end of the 13–3 state through the gate 332 into the DB portion of the D-register 60. Also at the end of the 13–3 state, the X-register 84 is set to 2, the order register 78 is set to order 1, the Q-register 82 is cleared and the S1F flip-flop 74 is cleared to re-establish the 1–3 state of the central control unit.

When the Q-count reaches 15 and all the characters of the segment have been transferred by previous executions of the order 13, the central control unit enters the 13–7 state in executing order 13. Again a memory cycle takes place. The 13–7 state is applied to the inhibit gate 62 so that the contents of the DA portion of the D-register 60 are written into the storage facility 50. The 13–7 state is applied to an OR circuit 370, the output of which provides a signal to the channel control unit, designated SCSS. The 13–7 state sets the DC portion of the D-register 60 to 15, thus establishing the next order as order 15 to be executed in conjunction with the designated buffer. The 13–7 state also clears the O-register 78 setting in order 1, clears the Q-register 82 and resets the S1F flip-flop 74 to 0, thus establishing the 1–7 state of the central control unit.

Order 15 is entered after sending an output segment to the window machine in order to receive a response that the output segment has been correctly received. Order 15 is similar to order 10 in which a response to an input poll is received and order 14 in which response to an output poll is received. Thus order 15 is best described in connection with the logic circuit of FIGURE 10 described above. The remote station signals a good response to transmission of an output segment of information by turning off the carrier used in transmitting the signals over the telephone line. The channel control unit, as will hereinafter be described in detail, generates a carrier channel sense signal CCSS which is true if the carrier is off. It should be noted that during the 1–3 state of the central control unit in which the order is loaded into the O-register 78, that the X-register 84 is set to 0 if the DB count is not 0 or if the CCSS signal is true. Thus when the 15–0 state is entered, the memory read cycle loads the D-register 60 with the parity character and the X and Z counts from the control word in the $X=00$ position of the buffer. It will be noted that during order 13 in which a segment was transferred from the buffer to the remote station, that the values of X and Z were counted up as each character was transferred. Therefore the value of X and Z as stored in the $X=00$ column of the buffer at the start of the order 15 is such as to point to the first character in the next segment. Following the memory read cycle during the 15–0 state, if CCSS is true indicating the carrier is off, an AND circuit 380 senses the 15–0 and the CCSS condition and operates the gate 300 to transfer the X-count in the DB portion of the D-register 60 into the X-register 84. Similarly, an AND circuit 382 senses that the 15–0 and CCSS conditions are true to open the gate 296 and transfer the Z-count in the DC portion of the D-register 60 to the Z-counter 224. At the same time, the output of the AND circuit 382 sets the P-register 80 to the count 5 condition thereby placing the central control unit in the 15–5 state.

During the 15–5 state, a memory read cycle is performed. Since the X and Z-registers point to the first character in the next segment to be read out of the buffer, this character is loaded into the D-register 60 during the 15–5 state. The character appears at the DI output of the gating circuit 226 and is decoded by a decoding circuit 384. Normally this character would be the motor bar character of the next segment to be transmitted to the window machine at the remote station. However, if the last segment read out of the buffer was the last full segment in the buffer, and additional segments must be loaded in the buffer from the processor before further transmission of data can take place, this character is set by the processor when loading the buffer to the binary equivalent of the number 14. If there are no more segments and this is the end of the message, this character is set to the binary equivalent of the number 15 when the buffer is loaded by the processor. The decoder 384 senses if the character is 14, setting a $DI=14$ line true or senses if the code is 15, setting a $DI=15$ line true. The $DI=14$ level and the $DI=15$ level are applied to an OR circuit 386, the output of which is negated by an inverter 388 and applied to an AND circuit 390. The 15–5 level is also applied to the AND circuit 390 so that the output of the AND circuit 390 is true if $DI=14$ or $DI=15$ are not true. The output of the AND circuit 390 resets the O-register 78 to the order 1 condition, clears the Q-counter 82 and at the same time sets the 8-bit of the Q-register 82 to 1. The output of the AND circuit 390 also sets the X-register 84 to the $X=02$ count condition and sets the P-register 80 to the 07 condition. Thus operation is returned to the 1–7 state described above in connection with FIGURE 5 which is used to complete the execution of each order.

If either the $DI=14$ or $DI=15$ condition is true, an AND circuit 392, connected to the output of the OR circuit 386 together with the 15–5 state, sets the P-register 80 to the 04 condition. If the $DI=14$ condition is true, indicating that further segments must be loaded into the buffer from the processor, the 4-bit in the Q-register 82 is set to 1 by the output of an AND circuit 394 that senses the $DI=14$ is true and that the 15–5 state pertains. It will be recalled that the 4-bit is used as the status bit designating that the buffer is in system ready condition for communication with the processor. Thus the buffer is in system status for further loading by the processor.

During the 15–4 state, a memory cycle takes place, but the 15–4 level is applied to the inhibit gates 62, 64, and 66 so that the existing contents of the D-register 60 are written into the $X=00$ position of the designated buffer. The 15–4 state sets the P-register 80 to the 6 condition, sets the X-register 84 to the $X=01$ condition, counts up the Q-register 82 by one and transfers the resulting Q-count through the gate 268 to the DB portion of the D-register 60.

With the O-register set at 15 and the P-register set at 6, the R–6 state is repeated, as already described above in connection with the description of orders 10 and 14, in which the buffer is reset and polling continues.

Instead of the carrier being turned off, indicating a good response to transmission of a segment, the remote station may send back a code 11 response as it did in the case of a response to an input poll or a response to an output poll. The code 11 response indicates that something was received at the remote station but for one reason or another the remote station could not accept the information and therefore the buffer should be reset. It is also possible that the carrier will not be turned off and there will be no response to the transmitted message. In either event, operation is similar to the order 10 and order 14 described above.

As shown in FIGURE 10, during the 15–1 state of the central control unit, an error is set in the 4-bit position of the Q-register 82 in response to an AND circuit 400 which senses the 15–1 state and that DA is not equal to 11, that is, the code number returned from the remote station is something other than 11 which is the only allowable response.

In the 15–7 state the error condition ERRS is sensed by an AND circuit 402 to produce a set channel carrier sense signal SCSS which is used in the channel control unit. In addition, the output of the AND circuit 402 resets the O-register 78 to the order 1 condition, clears the Q-register 82 and resets the X-register 84 to the $X=02$ condition. Operation in order 15 is otherwise identical to orders 10 and 14 in response to a code 11.

*Channel control unit*

Operation of a channel control unit in conjunction with the above described central control unit can best be described by reference to the schematic diagram of FIGURE 2 and the timing diagrams of FIGURES 3 and 4. In considering the operation of the channel control unit, clock pulses from the central control unit are used to provide synchronizing pulses for operating the various flip-flops and gates. However, the transfer of the information bits is controlled by a timer circuit 410 which is gated on by the output of an OR circuit 412. Whenever the output of the OR circuit 412 goes true, the timer delays for 500 microseconds and then generates a half microsecond pulse and continues to generate such pulses at intervals of one millisecond, corresponding to the bit rate of the telephone data sets. The pulses at the output of the timer 410 are referred to as information pulses or IP.

Initially, when the data set 36 is turned on, a channel ready signal CRS is generated for activating the channel control unit. The channel control unit may be in one of three states, namely, a sending state for sending information to the remote station, a receiving state for receiving information from the remote station or an idle state. The latter state is transitory since the channel is usually transmitting or receiving information.

As was pointed out above, during the 1–0 state of the central control unit, the S-counter 72 is advanced until it designates a channel in which the ANF flip-flop 42 is on, resulting in a CANS signal at the output of the AND circuit 44. Assuming an order follows the designation of a channel which requires transmission of a character from the central control unit to the remote station, an RCCS signal is first received from the central control unit which is applied to an AND gate 414 together with the channel designating signal CDS, the output of the AND circuit 414 turning off the ANF flip-flop 42. Because the clock pulse interval for the central control unit is only ten microseconds, the ANF flip-flop 42 is only on for a very short time on the time scale of FIGURES 3 and 4. When a character is present in the D-register 60 which is ready to be transferred to the channel control unit, the central control unit generates a send carrier information signal SCIS at the output of the AND circuit 220. See for example the T–1 state for orders 8, 9 and 12 described in connection with FIGURE 9. The SCIS level together with the CDS–1 is applied to an AND circuit 416, the output of which controls a gate 418 for transferring one character over the DI line from the D-register 60 to a single character register designated the B-register and indicated at 420. The SCIS signal and the CDS signal at the same time are applied to an AND circuit 421, the output of which turns on a send data flip-flop SDF, indicated at 422. When the SDF flip-flop 422 goes on, the channel control unit is in the sending state and it turns on a poll delay circuit PDY indicated at 424. The poll delay circuit 424 is a monostable multivibrator that remains on as long as the SDF flip-flop 422 is on. The PDY circuit 424 remains on for a period of eighty milliseconds after the SDF flip-flop is again turned off and then turns itself off. The poll delay circuit is used to continue operation of the channel if no response to the message sent is received back from the remote station after eighty milliseconds.

Figure 3:
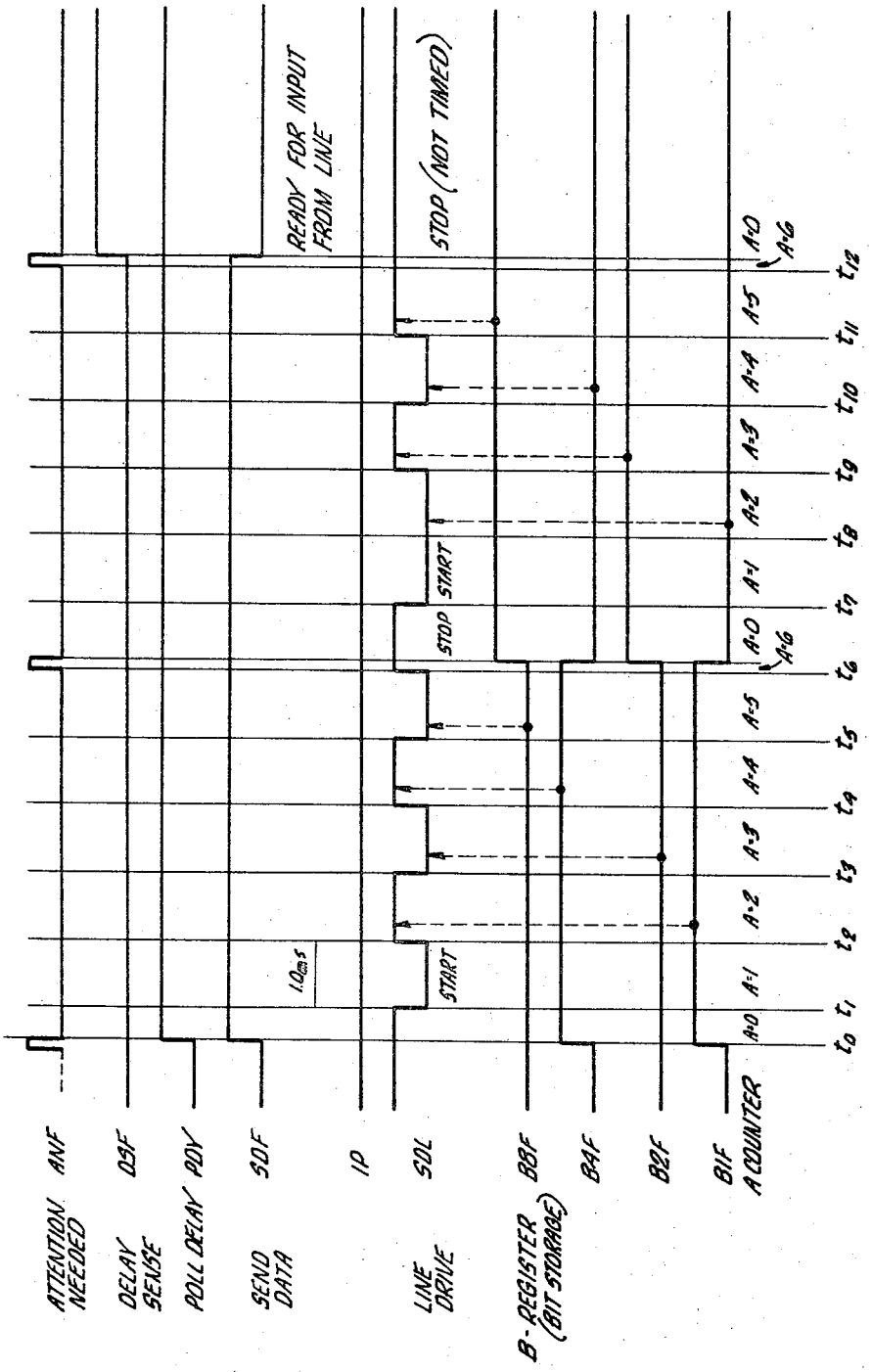
FIGURES 3 and 4 are timing diagrams of the operation of the channel control unit.
Figure 4:
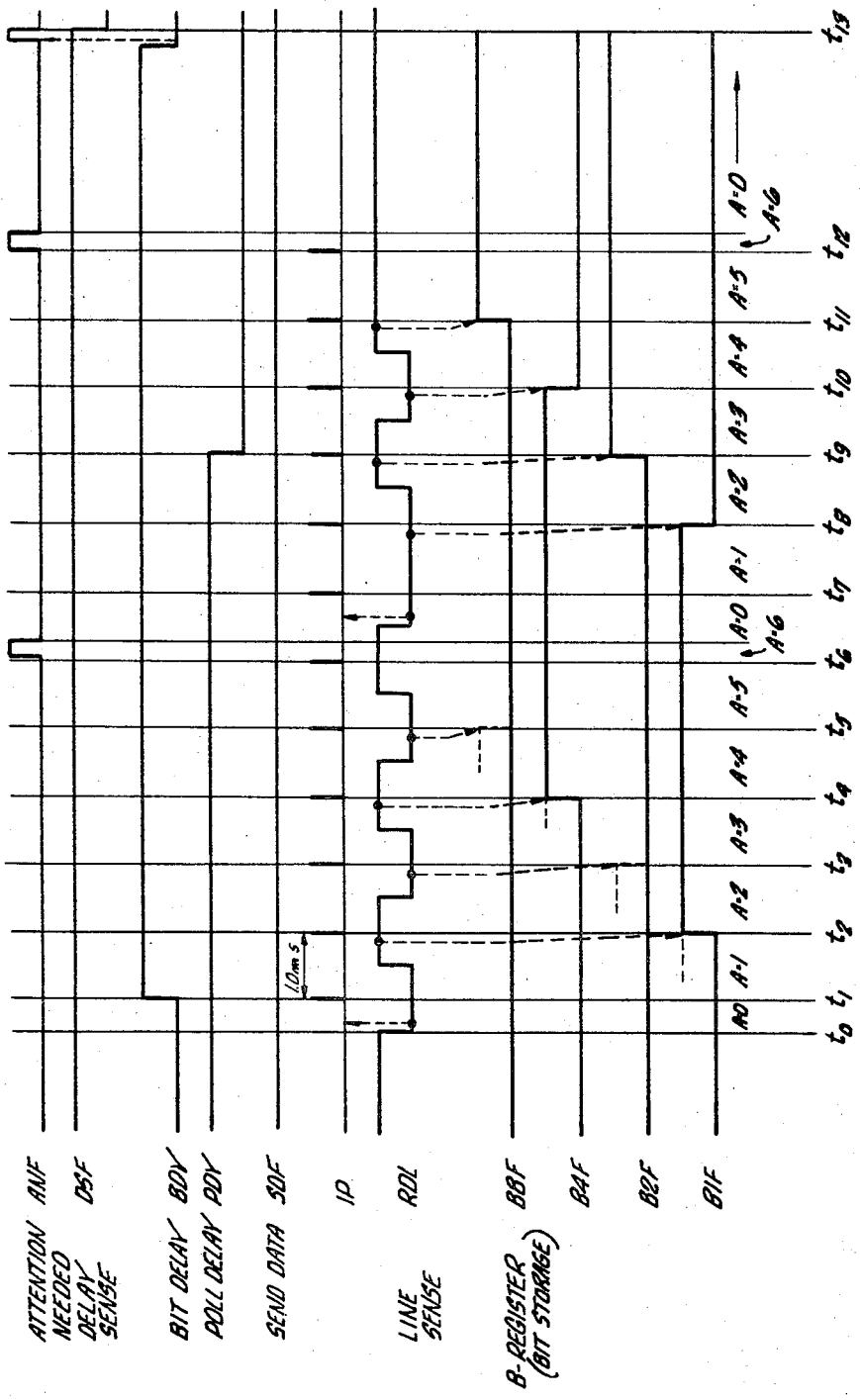

As shown in the timing diagram of FIGURE 3 the turning off of the ANF flip-flop 42, the turning on of the SDF flip-flop 422 and the turning on of the poll delay circuit 424 occur at time $t_0$. Also by way of example, the 1-bit and the 4-bit of the B-register 420 corresponding to the binary coded equivalent of the number 5 are set in the B-register 420 at time $t_0$. The setting of the four bits in the B-register is indicated by the lines B1F, B2F, B4F and B8F in FIGURE 3.

An AND circuit 426 senses that the signal CRS is true. It also senses that the SDF flip-flop 422 is on and that an STF flip-flop, indicated at 428, is off. The STF flip-flop is turned on by an SSTS signal from the central control unit if both buffers are in system status. As pointed out in the description of order 2 and in FIGURE 7, the SSTS stops operation of the channel. Thus, normally when the SDT flip-flop 422 goes on at time $t_0$, the timer 410 is turned on. The timer generates its first IP five hundred microseconds later at time $t_1$ as shown in the timing diagram of FIGURE 3. The output pulses IP of the timer 410 are applied to an A-counter 430 which is counted through its 8 count conditions, 0 through 7, at one millisecond intervals by the pulses from the timer 410. It will be noted that the $A=0$ state of the A-counter 430 is applied through an OR circuit 432 to the input of the data set 36, initially providing a high level to the input of the data set. The input to the data set 36 is called the send data line or SDL and is shown in the timing diagram of FIGURE 3.

When the A-counter 430 is advanced to the $A=1$ condition at time $t_1$, the output of the OR circuit 432 returns to the low level which indicates the start of a character transmission by the data set 36. When the A-counter 430 is advanced to the $A=2$ state at time $t_2$, a gate 434 in response to the $A=2$ state, transfers the 1-bit level of the B-register 420 to the SDL line going to the data set 36. Assuming the 1-bit is a one, as shown in the example of the timing diagram of FIGURE 3, the level to the input on SDL to the data set again goes high. Similarly, the 2-bit in the B-register 420 is gated during the $A=3$ count condition of the A-counter 430 by a gate 436. During the $A=4$ count condition, a gate 438 transfers the level of the 4-bit in the B-register 420 to the data set 36. During the $A=5$ count condition, a gate 440 transfers the 8-bit of the character in the B-register 420 to the data set 36.

When the A-counter 430 advances to the $A=6$ condition at time $t_6$, it produces a high level at the output of the OR circuit 432 going to the data set 36, indicating the end of the character transmission. At the same time, the ANF flip-flop 42 is turned on by the output of an AND circuit 442 to which the $A=6$ condition is applied together with the off condition of the STF flip-flop 428. Once the ANF flip-flop 42 goes on and the S-counter again designates the channel, the CDS-1 level goes true. The same order is read out again in the central control unit and the second character is transferred to the B-register 420 by the SCIS level. The same clock pulse which establishes the SCIS level also establishes the RCCS level which turns off the ANF flip-flop 42. Also the A-register 430 is reset to 0 by the output of an AND circuit 444 which senses the $A=6$ condition and the RCCS reset signal and the CDS-1 signal. Since the time for scanning and loading a new order into the order register by the central control unit takes place within a few clock pulse intervals, the timing operation of the timer 410 is not affected and the counting of the A-counter 430 continues at the one millisecond intervals. It will be noted that the A-counter is in the $A=6$ condition and the $A=0$ condition for a combined interval of one millisecond as shown by the timing diagram of FIGURE 3. During the next five timing intervals from $t_7$ through $t_{11}$, the bits of the next character, which is shown by way of example as being the binary equivalent of the number 10, is transmitted by the data set to the remote station.

While a polling message, for example, requires the transmission of three characters, the window machine address, the code designating an input or output poll, and the parity character, the timing diagram of FIGURE 3 shows only the transmission of the first and last characters of a message. At time $t_{12}$, when the A-counter 430 goes into the $A=6$ condition, the ANF flip-flop 42 is again turned on. This time, the order does not generate the SCIF signal since the last character has already been transmitted. Again the RCCS from the central control unit turns off the ANF flip-flop 42 and resets the A-counter 430 back to 0. At the same time, the SDF flip-flop 422 is turned off by the output of the AND circuit 446 which senses the CDS-1 signal, the RCCS signal, and the fact that the SCIS is not ture as derived by applying the SCIS signal through an inverter 448. The PDY delay circuit 424 begins timing out eighty milliseconds before turning off.

Following the transmission of the last character when polling for input or polling for output, it will be recalled that during the T-7 state of the central control unit an SDSS signal is produced by the central control unit. See FIGURE 9. This signal is applied through an AND gate 450 together with the CDS-1 signal to set the DSF flip-flop 452 to the on condition. This is shown in the timing diagram of FIGURE 3 as occurring shortly after the ANF flip-flop 42 is turned off following the last character transmitted during the sending of an input poll or an output poll.

With the DSF flip-flop 452 turned on, the channel control unit is now in the receiving state for receiving information from the remote station in conjunction with orders 10, 11, 14 and 15. FIGURE 4 shows the timing diagram for the receiving state. The timer 410 is controlled by the output of an AND circuit 454 which senses by means of the CRS signal that the data set 36 is turned on, that the A-counter 430 is in the $A=0$ state, that the DSF flip-flop 452 is on, that the STF flip-flop 428 is off, that a delay monostable multivibrator TRM, indicated at 456, is off, and that the read data line RDL at the output of the data set 36 has changed from a high level to a low level indicating the start of character transmission from the remote station. An inverter 458 provides a high level to the AND circuit 454 when the RDL goes low. The output of the AND circuit 454 starts the timer 410 timing out the five hundred microsecond delay before the first information pulse IP is generated. In the timing diagram of FIGURE 4, the timer 410 starts at time $t_0$ and the first IP occurs at time $t_1$.

The first IP advances the A-counter to the $A=1$ condition. A bit delay circuit BDY, indicated at 460, is turned on in response to the $A=1$ condition as applied through an OR circuit 462. The $A=2$, the $A=3$, and the $A=4$ conditions are also applied to the BDY delay circuit 460 through an OR circuit 462. When the $A=4$ condition of the A-counter 430 terminates, the delay circuit 460 holds for a delay period of four milliseconds, corresponding to four IP intervals of the timer 410 before resetting to its off condition. The purpose of the BDY circuit is to set a time for determining that no more characters are being received. It should be noted that for a proper response from the remote station in answer to an input poll or an output poll, or the transmission of an information segment, the response from the remote station should be received in less than the eighty millisecond time delay period of the PDY delay circuit 424, so that the PDY circuit is still on while characters are being received from the remote station, as shown by the timing diagram of FIGURE 4.

As the A-counter 430 is counted through the $A=1$ to $A=4$ conditions, the four bits of the received character are set into the B-register 420. A gate 464 sets the 1-bit during the $A=1$ count condition, a gate 466 sets the 2-bit during the $A=2$ count condition, a gate 468 sets the 4-bit during the $A=3$ count condition and a gate 470 sets the 8-bit during the $A=4$ count condition. It should be noted that the timer 410 remains on during the $A=1$, 2, 3, 4 and 5 states, in response to the output of an OR circuit 472 which is applied to the timer by an AND circuit 474 that senses also that the DSF flip-flop 452 is on.

After the B-register 420 is loaded with the character from the remote station, and the A-counter 430 advances to the $A=6$ count condition, the ANF flip-flop 42 is turned on indicating that the channel control unit needs attention from the central control unit. The ANF flip-flop 42 is turned on by the output of the AND circuit 442 that senses the $A=6$ count condition and senses that the STF flip-flop 428 is off. As a result of the ANF flip-flop 42 going on, the central control unit begins the execution of an order 10, 11, 14 or 15, which are the orders in which information is received from the remote station. In executing any one of these orders, the RCCS signal is generated which turns off the ANF flip-flop 42 and also resets the A-counter 430 back to 0 by means of the AND circuit 444. In execution of an order by the central control unit, the character stored in the B-register 420 is transferred over the CB line to the central control unit in the manner already described.

The above described operation of the channel control unit continues for subsequent characters received in a message from the remote station. Some time during the receiving of the characters from the remote station, the PDY delay circuit 424 will time out. The exact time at which it times out is not critical as long as it occurs while the BDY circuit 460 is on.

As each character is loaded into the B-register 420 and the A-counter reaches the $A=6$ condition, an AND circuit 476 senses the $A=6$ condition and the CDS-1 signal to produce the output signal CIPS which indicates to the central control unit that information is present in the B-register of the channel control unit. If there is no information present, and AND circuit 478 senses that the DSF flip-flop 452 is on and that the CDS-1 signal is present and, by means of an inverter 480, senses that the output of the AND circuit 476 is not true. The output of the AND circuit 478 is the signal CDSS which is used by the central control unit in orders 10, 11, 14 and 15 to indicate that the last character of the message from the remote station has been received and no character is present in the B-register.

After sending an input poll, if the window machine at the remote station is ready to read out information, the remote station immediately sends back a response to the input poll. At the same time, it initiates a read out operation from the window machine into a buffer at the remote station which takes about two hundred milliseconds. The TRM monostable multivibrator delay circuit 456 times out the two hundred millisecond delay. The TRM delay circuit is turned on by the output of an AND circuit 482 to which the SCRS signal generated in the last step of order 10, the order used to initiate an input poll, together with the channel designate signal CDS-1 are applied.

The off condition of the three delay circuits 424, 460 and 456 are applied to an AND circuit 484 together with the on condition of the DSF flip-flop 452. Only when all of the three delay circuits have timed out is the output of the AND circuit 484 true, at which time the output of the AND circuit turns on the ANF flip-flop 42 again, as indicated at time $t_{13}$ in FIGURE 4. This time, since no character has been loaded in the B-register 420, the output of the AND circuit 478 is true and the CDSS signal is present at the central control unit.

It will be recalled that in order 13 and also in order 15 a signal SCSS was generated by the central control unit. This is applied through an AND circuit 486 together with the signal CDS-1 to turn on a CSF flip-flop 488. If the carrier goes off, an AND circuit 490 senses through an inverter 492 that the carrier receive signal from the data set 36 is off, that the STF flip-flop 428 is off, and that the CSF flip-flop 488 is on. The output of the AND circuit 490 turns on the ANF flip-flop 42. The subsequent reset pulse RCCS from the central control unit turns off the CSF flip-flop 488. At the same time, it turns off the ANF flip-flop 42.

If instead of the carrier being turned off, a message is received, such as a code 11 response, the output of the AND circuit 454 will go true and the timer 410 will begin to operate. On reaching the $A=6$ count condition of the counter 430, the DSF flip-flop 452 is turned on and operation continues on subsequent characters in the same manner described above.

Remote terminal unit

The operation of the remote station can best be understood by reference to FIGURE 13. Each remote station, as pointed out in connection with FIGURE 1, services a number of window machines, each of which has its own address. In FIGURE 13, only one such window machine is indicated at 500. Each window machine is a standard type of keyboard operated machine which accepts forms or passbooks for printing out up-dated information. For example, the window machine may be a standard style F6214 Sensimatic machine manufactured by the Burroughs Corporation. In operation, a teller inserts the passbook in the window machine, enters the account number on the keyboard and this information is stored in a register in the window machine. The teller then enters the previous balance of the passbook on the keyboard and this amount is entered in a register in the window machine, and finally the teller enters the amount of the deposit or withdrawal. The window machine communicates with a register 502 which stores one segment of information from which data can be transferred serially character by character to a single character register 504 which communicates with the telephone data set 506 in the same manner as the B-register 420 and data set 36 described above in connection with FIGURE 2.

Once an entry is made into the window machine 500, a signal is set on a send line from the window machine, indicating that the window machine is loaded and ready to transmit data to the central station. The remote station now waits for an input poll message from the central control unit addressing the particular window machine. When the input poll is received, the first character of the poll is loaded into the character register 504.

A sequence control circuit 508 controls the sequence of operations at the remote terminal unit. The sequence control circuit 508 is initially in the $S_1$ condition which turns on a receive control circuit 510. The receive control circuit 510 operates in the same manner as the control circuitry in the channel control unit described above to load the character into the character register 504 as the information is received serially over the data set 506. In addition, the receive control circuit 510 senses when each character is loaded in register 504 and distributes the three characters of the poll message in sequence to a window machine address register 512, a code register 514 and a parity register 516.

The address register 512 in response to the received window machine address activates one of N lines, sending a signal to the selected one of the window machines as identified by the address to initiate read out of the window machine into the storage buffer 502. The code register will contain a code 12 to indicate an input poll, a code 14 to indicate an output poll, or a code 15 to indicate that the information should be transmitted from the window machine back to the buffer in the central control unit. The operation of the remote terminal unit in response to an input poll will be considered first.

A parity check circuit 518 in response to the parity character in the register 516 determines whether or not there has been a parity error in the message received from the remote station. The parity check circuit 518 provides a signal on one of two output lines designated PG, for a good parity check, and PB for a bad parity check. If there is a bad parity check, the sequence control 508 is reset to the $S_1$ state by the output of an AND circuit 520 and the input poll is ignored. However, if the parity check is good, the sequence control circuit 508 is set to the $S_2$ state through an AND circuit 522. The AND circuit also senses the $S_1$ state and the end of the polling message as signalled by the receive control circuit 510.

If the window machine which was adressed by the input poll has no information entered, it will be in an idle state and a signal will occur on the output line designated Idle. The Idle signal is applied to an AND circuit 524 together with the $S_2$ state. The output of the AND circuit 524 sets the code register 514 to code 11 through an OR circuit 527. If the window machine is in the Send condition rather than Idle, an AND circuit 530 senses the code 12 condition from the code register 514 and the send condition of the window machine 500 during the $S_2$ state. The output of the AND circuit 530 starts a read out cycle in the window machine for loading the buffer register 502 with the data from the addressed window machine.

The sequence control 508 then advances automatically to the $S_3$ state. The $S_3$ state energizes a send control circuit 528 which operates in the same manner as the channel control unit described above to load the contents of the address register 512, the code register 514 and the parity register 516 in sequence into the character register 504 and to relay each character serially bit by bit to the data set 506 for transmission back to the central station. It will be recalled that a code 11 response at the central control unit is interpreted as indicating that the particular window machine should be polled again. A code 12 response sets off a "transmit" order 09 in the central control unit.

If a code 11 was set up because the window machine is idle an AND circuit 526 senses that the send control 528 has completed operation, that code 11 is in the register 514 and the $S_3$ condition exists. The AND circuit 526 resets the sequence control 508 back to $S_1$. Otherwise with the window machine set to send information, the sequence control is set to the $S_4$ state by the output of an AND circuit 532 which senses that code 12 is true, that the sequence control is in the $S_3$ state and that the send control 528 has completed operation.

During the $S_4$ state, the receive control 510 is again activated in preparation of receiving a "transmit" message from the central control unit, which message includes again the window machine address, a code 15 and a parity character. As the message is received over the data set 506 and each character is loaded into the character register 504, the receive control circuit 510 transfers the respective characters in sequence to the address register 512, the code register 514 and the parity register 516. However, before the first character is loaded into the address register 512, a comparison circuit 534 compares the previous address in the register 512 with the window machine address received from the central control unit. If the addresses are not equal, a line designated $\neq$ is used to reset the sequence control 508 back to the $S_1$ state through an AND circuit 536 which senses the $S_4$ state and the end of the first character as signalled by the receive control circuit 510. If the addresses are equal, the operation goes forward in normal manner in which the registers 512, 514, 516 are loaded in sequence by the message received from the central station.

Again, if there is a parity error, the sequence control is reset in response to the PB output of the parity check circuit 518. However, if there is no parity error, an AND circuit 538 sets the sequence control circuit to the $S_5$ state by sensing that it is in the $S_4$ state, that a code 15 is present and that the parity check is good.

During the $S_5$ state, a send information control circuit 540 is activated which is used to transfer the contents of the buffer register 502 character by character through a gate 539 into the character register 504 and to cause each character to be read out serially bit by bit into data set 506 for transmission to the central control unit. The send information control circuit 540 merely times out the shifting of the characters and when the last character is shifted out, it applies a signal to an AND circuit 542 which also senses the $S_5$ state. The output of the AND circuit 542 resets the sequence control 508 to the $S_4$ state.

If the transmitted information has been properly received, another poll for input or poll for output of a different window machine will be received from the central control unit. If, on the other hand, the information has not been properly received, the same window machine may be polled again by the central control unit. Thus, the same window machine address is received in the character buffer 504 during the $S_4$ state, the output of the compare circuit 534 will be true and the transmit operation of the $S_5$ state will be repeated. On the other hand, if a new window machine address is received, the $=$ output of the compare circuit 534 will not be true and the sequence control circuit 508 will be reset to the $S_1$ condition in which all the registers are cleared ready to receive the next polling message.

The next polling message from the central control unit may poll for output in which case a 14 is loaded in the code register 514. Once a window machine has transmitted information, it is placed in the receive ready condition in which an output line designated Receive is true. This line is applied to an AND circuit 544 together with the $S_2$ state and the code 14 condition from the code register 514. If there is no parity error resetting the sequence control 508 back to the $S_1$ state, the output of the AND circuit 544 sets the sequence control into the $S_3$ state. If the window machine is in the idle condition, the output of the AND circuit 524 sets up a code 11 in place of the code 14. The sequence control $S_3$ turns on the send control circuit 528 causing the contents of the address register 512, the code register 514 and the parity register 516 to be relayed back to the central control unit through the character buffer 504 and data set 506.

It should also be noted that an AND circuit 546 senses that a code 12 is received when the window machine is in a receive condition and an AND circuit 548 senses that a code 14 is received when the window machine is in a send condition, both of which are error conditions. The output of the AND circuits 546 and 548 are applied to an alarm circuit 550 and also used to set the code register 514 to the code 11. The central control unit in response to a code 14, sets up order 13 for sending an input segment of information to the remote station. Again, the sequence control is set to the $S_4$ state if a code 14 is present in the code register 514 by the output of the AND circuit 532, activating the receive control circuit 510. If a code 11 is present in the code register 514, the sequence control is reset to $S_1$ by the AND circuit 526.

When the information segment is received from the central control station, the first character again is the window machine address which is compared by the comparison circuit 534. If the two addresses compare, the next character is loaded into the code register 514. In this case, the code will be a motor bar code which controls the carriage positioning of the window machine 500. The low order bit of the motor bar code also indicates whether or not information data is to follow or whether a parity character will follow completing the message segment. The low order bit of the motor bar code is applied to an AND circuit 552 which senses the $S_4$ condition and sets the sequence control to $S_6$ to indicate that information data is included in the message segment.

The $S_6$ condition interrupts the operation of the receive control circuit 510 and activates a receive information control circuit 554. The receive information circuit is a timing circuit which causes the subsequent twelve characters received in the character register 504 to be loaded into the buffer register 502 through a gate 553 and then to initiate a print cycle of the window machine 500 to print out the segment of information loaded in the buffer 502. When the twelfth character has been received, a complete pulse from the receive information control circuit 554 resets the sequence control to $S_4$ through an AND circuit 558 to which the $S_6$ state is also applied. The receive control circuit 510 is again activated and shifts the next character into the parity register 516 to provide a parity check.

With the completion signal from the receive control 510, an AND circuit 560 senses that the motor bar code is present and that a good parity check has been made by the parity check circuit 518. The output of the AND circuit 560 resets the sequence control 508 back to the $S_1$ state and initiates a print cycle in the window machine 500 thus completing the operation.

What is claimed is:

1. Apparatus for relaying information between any one of a plurality of input-output units at remote stations and a central station over a plurality of separate transmission channels, a group of input-output units at a remote station being associated with one transmission channel, said apparatus comprising a pair of addressable storage buffers at the central station for each transmission channel; means associated with each pair of buffers including means storing an order designating an operation to be performed over the channel associated with the particular pair of buffers, means storing a number designating the number of times the order has been executed, and means storing a signal designating which of the pair of buffers is to be used in executing the order; means associated with each buffer for storing the address of a particular input-output unit and storing information designating whether the buffer is ready to send or receive data over the associated transmission channel; a counter for designating a particular channel and the associated pair of buffers, means for signalling when a channel is free; means responsive to the counter and said channel free signalling means for initiating a transmission operation with one of the input-output units associated with the channel designated by the counter, said last-named means including means sensing the contents of the associated means storing the order, the means storing the number of times the order has been executed, and the means storing the signal designating which of the pair of buffers is assigned to the order, means responsive to the sensing means when a first order is designated and the order is executed for the first time for transmitting the address of a particular input-output unit to the remote station to identify a particular input-output unit and advancing the number in said number storing means by one, and means responsive to the sensing means when said first order is designated and the order is executed for the second time for transmitting a coded signal to initiate the transmission of data from the designated input-output unit to one of the buffers assigned to channel by the counter and means storing the signal designating which of the pair of buffers is assigned to the order.

2. Apparatus for relaying information between any one of a plurality of input-output units at remote stations and channels, a group of input-output units at a remote station being associated with one transmission channel, said apparatus comprising a pair of addressable storage buffers at the central station for each transmission channel; means associated with each pair of buffers including means storing an order designating an operation to be performed over the channel associated with the particular pair of buffers, means storing a number designating the number of times the order has been executed, and means storing a signal designating which of the pair of buffers is to be used in executing the order; means associated with each buffer for storing the address of a particular input-output unit and storing information designating whether the buffer is ready to send or receive data over the associated transmission channel; a counter for designating a particular channel and the associated pair of buffers, means for signalling when a channel is free; means responsive to the counter and said channel free signalling means for initiating a transmission operation with one of the input-output units associated with the channel designated by the counter, said last-named means including means sensing the contents of the associated means storing the order, the means storing the number of times the order has been executed, and the means storing the signal designating which of the pair of buffers is assigned to the order, means responsive to the sensing means when a second order is designated and the order is executed for the first time for transmitting the address of a particular input-output unit to the remote station to identify a particular input-output unit and advancing the number in said number storing means by one, and means responsive to the sensing means when said second order is designated and the order is executed for the second time for transmitting a coded signal to initiate the transmission of data to the designated input-output unit from one of the buffers assigned to the channel by the counter and means storing the signal designating which of the pair of buffers is assigned to the order.

3. Apparatus for relaying information between any one of a plurality of input-output units at remote stations and a central station over a plurality of separate transmission channels, a group of input-output units at a remote station being associated with one transmission channel, said apparatus comprising a pair of addressable storage buffers at the central station for each transmission channel; means associated with each pair of buffers including means storing an order designating an operation to be performed over the channel associated with the particular pair of buffers, means storing a number designating the number of times the order has been executed, and means storing a signal designating which of the pair of buffers is to be used in executing the order; means associated with each buffer for storing the address of a particular input-output unit and storing information designating whether the buffer is ready to send or receive data over the associated transmission channel; a counter for designating a particular channel and the associated pair of buffers, means for signalling when a chanel is free; means responsive to the counter and said channel free singalling means for initiating a transmission operation with one of the input-output units associated with the channel designated by the counter, said last-named means including means sensing the contents of the associated means storing the order, the means storing the number of times the order has been executed, and the means storing the signal designating which of the pair of buffers is assigned to the order, means responsive to the sensing means when a first order is designated and the order is executed for the first time for transmitting the address of a particular input-output unit to the remote station to identify a particular input-output unit and advancing the number in said number storing means by one, and means responsive to the sensing means when said first order is designated and the order is executed for the second time for transmitting a coded signal to initiate the transmission of data from the designated input-output unit to one of the buffers assigned to the channel, means responsive to the sensing means when a second order is designated and the order is executed for the first time for transmitting the address of a particular input-output unit to the remote station to identify a particular input-output unit and advancing the number in said number storing means by one, and means responsive to the sensing means when said second order is designated and the order is executed for the second time for transmitting a coded signal to initiate the transmission of data to the designated input-output unit from one of the buffers assigned to the channel by the counter and means storing the signal designating which of the pair of buffers is assigned to the order.

4. Apparatus for relaying information between any one of a plurality of input-output units at remote stations and a central station over a plurality of separate transmission channels, a group of input-output units at a remote station being associated with one transmission channel, said apparatus comprising addressable storage buffers at the central station for each transmission channel; means associated with each buffer including means storing an order designating an operation to be performed over the channel associated with the particular buffer, means storing a number designating the number of times the order has been executed, means associated with each buffer for storing the address of a particular input-output unit and storing information designating whether the buffer is ready to send or receive data over the associated transmission channel, means for designating a particular channel and the associated buffer, means for signalling when a channel is free; means responsive to the channel designating means and said channel free signalling means for initiating a transmission operation with one of the input-output units associated with the channel designated by the channel designating means, said last-named means including means sensing the contents of the associated means storing the order, and the means storing the number of times the order has been executed, means responsive to the sensing means when a first order is designated and the order is executed for the first time transmitting the address of a particular input-output unit to the remote station to identify a particular input-output unit and advancing the number in said number storing means by one, and means responsive to the sensing means when said first order is designated and the order is executed for the second time for transmitting a coded signal to initiate the transmission of data from the designated input-output unit to one of the buffers assigned to the channel by the counter and means storing the signal designating which of the pair of buffers is assigned to the order.

5. Apparatus for relaying information between any one of a plurality of input-output units at remote stations and a central station over a plurality of separate transmission channels, a group of input-output units at a remote station being associated with one transmission channel, said apparatus comprising addressable storage buffers at the central station for each transmission channel; means associated with each buffer including means storing an order designating an operation to be performed over the channel associated with the particular buffer, means storing a number designating the number of times the order has been executed; means associated with each buffer for storing the address of a particular input-output unit and storing information designating whether the buffer is ready to send or receive data over the associated transmission channel; means for designating a particular channel and the associated buffer, means for signalling when a channel is free; means responsive to the channel designating means and said channel free signalling means for initiating a transmission operation with one of the input-output units associated with the channel designated by the channel designating means, said last-named means including means sensing the contents of the associated means storing the order, and the means storing the number of times the order has been executed, means responsive to the sensing means when a second order is designated and the order is executed for the first time for transmitting the address of a particular input-output unit to the remote station to identify a particular input-output unit and advancing the number in said number storing means by one, and means responsive to the sensing means when said second order is designated and the order is executed for the second time for transmitting a coded signal to initiate the transmission of data to the designated input-output unit from one of the buffers assigned to the channel by the counter and means storing the signal designating which of the pair of buffers is assigned to the order.

6. Apparatus for relaying information between any one of a plurality of input-output units at remote stations and a central station over a plurality of separate transmission channels, a group of input-output units at a remote station being associated with one transmission channel, said apparatus comprising addressable storage buffers at the central station for each transmission channel; mean associated with each buffer including means storing an order designating an operation to be performed over the channel associated with the particular buffer, means storing a number designating the number of times the order has been executed; means associated with each buffer for storing the address of a particular input-output unit and storing information designating whether the buffer is ready to send or receive data over the associated transmission channel; means for designating a particular channel and the associated buffer, means for signalling when a channel is free; means responsive to the channel designating means and said channel free signalling means for initiating a transmission operation with one of the input-output units associated with the channel designated by the channel designating means, said last-named means including means sensing the contents of the associated means storing the order, and the means storing the number of times the order has been executed, means responsive to the sensing means when a first order is designated and the order is executed for the first time for transmitting the address of a particular input-output unit to the remote station to identify a particular input-output unit and advancing the number in said number storing means by one, means responsive to the sensing means when said first order is designated and the order is executed for the second time for transmitting a coded signal to initiate the transmission of data from the designated input-output unit to one of the buffers assigned to the channel, means responsive to the sensing means when a second order is designated and the order is executed for the first time for transmitting the address of a particular input-output unit to the remote station to identify a particular input-output unit and advancing the number in said number storing means by one, and means responsive to the sensing means when said second order is designated and the order is executed for the second time for transmitting a coded signal to initiate the transmission of data to the designated input-output unit from one of the buffers assigned to the channel by the counter and means storing the signal designating which of the pair of buffers is assigned to the order.

7. Apparatus for relaying information between a plurality of remote input-output units and a central station having a data processor system comprising means at the central station including a counter for generating an address identification for each of the remote input-output units in sequence, means at the central station for generating a coded signal designating a request for information, means for transmitting an address identification and coded information request signal to each of the input-output units, means at each of the remote input-output units responsive to the information request signal and address identification for relaying the address designation back to the central station together with a coded signal indicating whether or not the particular input-output unit identified by the address identification is ready to transmit a message to the data processor.

8. Apparatus for relaying information between a plurality of remote input-output units and a central station having a data processor system comprising means at the central station for generating an address identification for each of the remote input-output units in sequence, means at the central station for generating a coded signal designating a request for information, means for transmitting an address identification and coded information request signal to each of the input-output units, means at each of the remote input-output units responsive to the information request signal and address identification for relaying the address designation back to the central station together with a coded signal indicating whether or not the particular input-output unit identified by the address identification is ready to transmit a message to the data processor.

9. The method of relaying information between input-output units located at each of a plurality of remote stations and a storage facility at a central station over a plurality of separate transmission channels, comprising the steps of sensing in predetermined sequence a channel that is free for transmission, on sensing a free channel establishing the status of the storage facility to determine if it is in condition to transmit or receive data from the remote station associated with that channel, sending an address identifying a particular input-output unit to the remote station together with a coded signal indicating that the memory is ready to receive data from or send data to the particular input-output unit addressed, returning the address of the input-output unit from the remote station together with a coded signal indicating that the particular input-output unit at the remote station is ready to send data to or receive data from the storage facility at the central station, and sending the same address together with a coded signal indicating that the data should be transmitted over the channel to the storage facility in response to a signal from the remote station indicating the input-output unit is ready to send data.

10. The method of relaying information between input-output units located at each of a plurality of remote stations and a storage facility at a central station over a plurality of separate transmission channels, comprising the steps of sensing in predetermined sequence a channel that is free for transmission, on sensing a free channel establishing the status of the storage facility to determine if it is in condition to transmit or receive data from the remote station associated with that channel, sending an address identifying a particular input-output unit to the remote station together with a coded signal indicating that the memory is ready to receive data from or send data to the particular input-output unit addressed, and returning the address of the input-output unit from the remote station together with a coded signal indicating that the particular input-output unit at the remote station is ready to send data to or receive data from the storage facility at the central station.

11. The method of relaying information between input-output units located at a remote station and a storage facility at a central station over a transmission channel, comprising the steps of establishing the status of the storage facility to determine if it is in condition to transmit or receive data from the remote station, sending an address identifying a particular input-output unit to the remote station together with a coded signal indicating that the memory is ready to receive data from or send data to the particular input-output unit addressed, returning the address of the input-output unit from the remote station together with a coded signal indicating that the particular input-output unit at the remote station is ready to send data to or receive data from the storage facility at the central station and sending the same address together with a coded signal indicating that the data should be transmitted over the channel to the storage facility in response to a signal from the remote station indicating the input-output unit is ready to send data.

12. The method of relaying information between input-output units located at a remote station and a storage facility at a central station over a transmission channel, comprising the steps of establishing the status of the storage facility to determine if it is in condition to transmit or receive data from the remote station, sending an address identifying a particular input-output unit to the remote station together with a coded signal indicating that the memory is ready to receive data from or send data to the particular input-output unit addressed, and returning the address of the input-output unit from the remote station together with a coded signal indicating that the particular input-output unit at the remote station is ready to send data to or receive data from the storage facility at the central station.

References Cited

UNITED STATES PATENTS

| 3,293,612 | 12/1966 | Ling | 340—172.5 |
| 3,308,439 | 3/1967 | Tink et al. | 340—172.5 |

EUGENE G. BOTZ, *Primary Examiner.*

UNITED STATES PATENT OFFICE
CERTIFICATE OF CORRECTION

Patent No. 3,407,387                          October 22, 1968

Floyd W. Looschen et al.

It is certified that error appears in the above identified patent and that said Letters Patent are hereby corrected as shown below:

Column 1, line 60, "wnidow" should read -- window --; line "a teach" should read -- at each --. Column 3, line 21, "of" should read -- or --. Column 6, line 25, "condtiion" should read -- condition --. Column 8, line 35, "bids" should read -- bits --. Column 15, line 37, after "order" insert -- 1 --. Column 16, line 75, after "The" insert -- DA=11 and the --. Column 19 line 5, "buits" should read -- bits --. Column 27, line 70, "ture" should read -- true --. Column 33, line 43, after "and" insert -- a central station over a plurality of separate transmission --. Column 34, line 25, "chanel" should read -- channel --; line 26, "singalling" should read -- signalling --. Column 35, line 62, "mean" should read -- means --.

Signed and sealed this 27th day of January 1970.

(SEAL)
Attest:

EDWARD M. FLETCHER, JR.                      WILLIAM E. SCHUYLER, JR.
Attesting Officer                              Commissioner of Patents